Dec. 22, 1953  B. JORGENSEN  2,663,036
LASTING MACHINE
Filed Dec. 20, 1949  20 Sheets-Sheet 1

Inventor
Bernhardt Jorgensen
By his Attorney

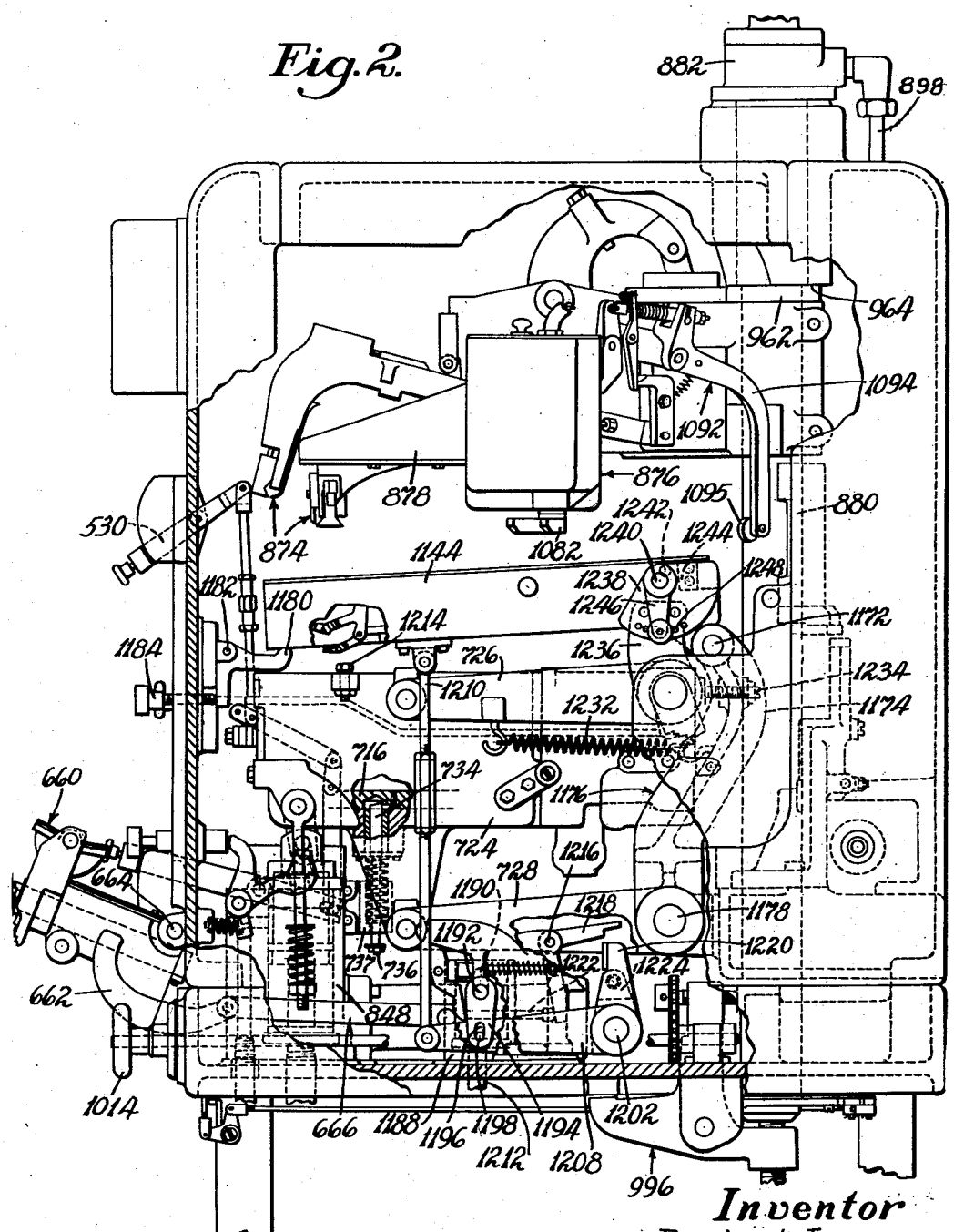

Inventor
Bernhardt Jorgensen
By his Attorney

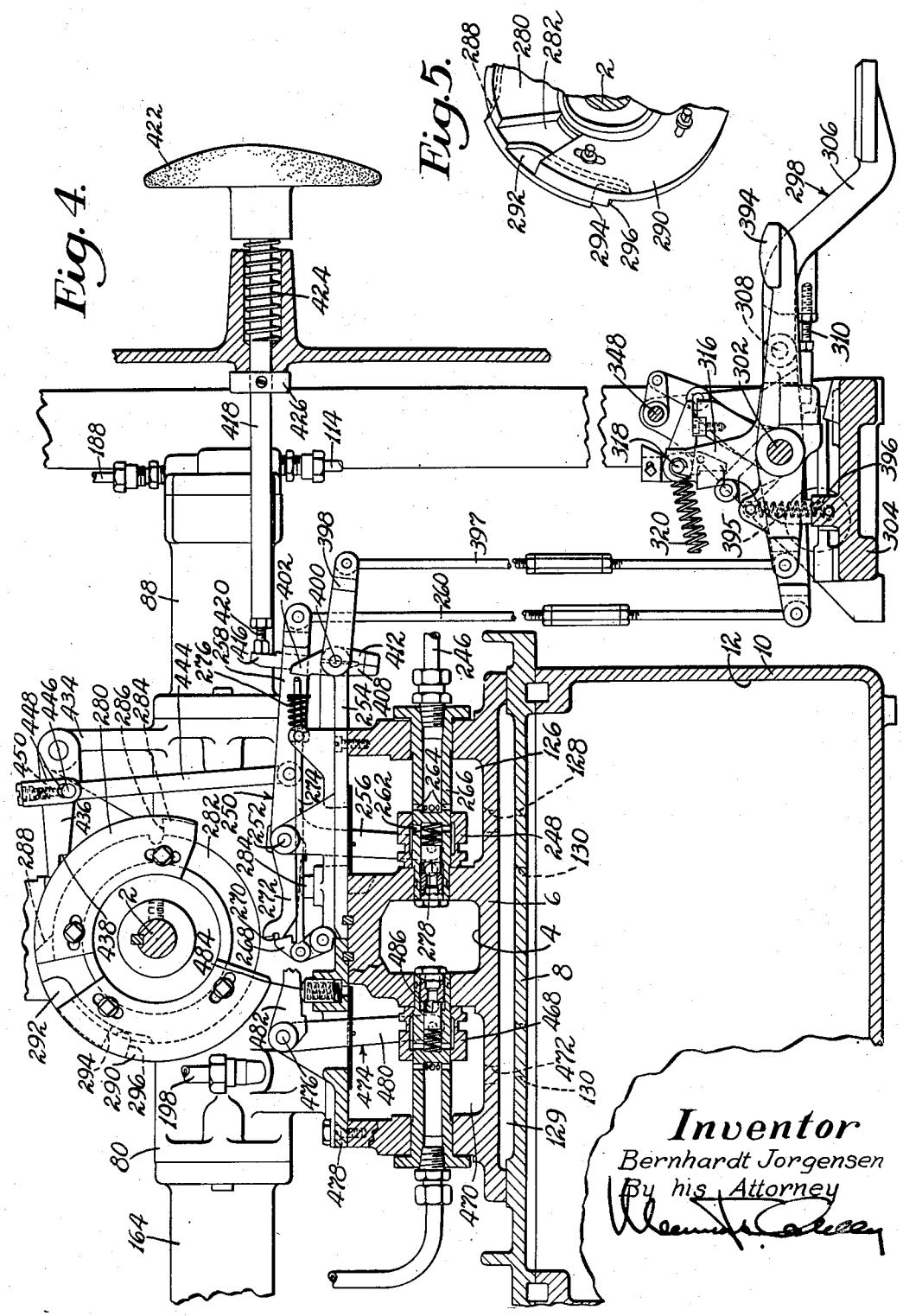

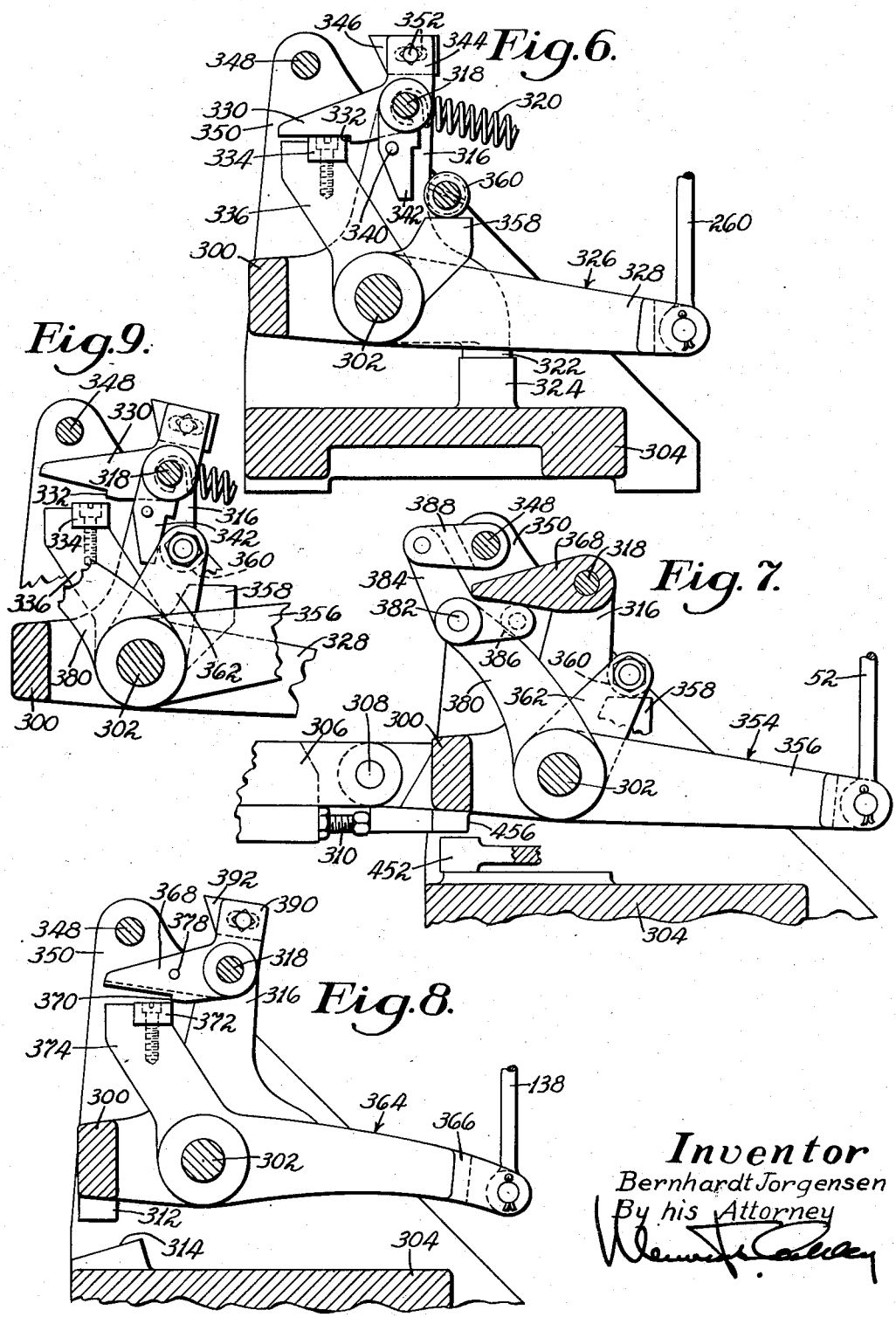
Dec. 22, 1953  B. JORGENSEN  2,663,036
LASTING MACHINE
Filed Dec. 20, 1949  20 Sheets-Sheet 5
Inventor
Bernhardt Jorgensen
By his Attorney

Dec. 22, 1953   B. JORGENSEN   2,663,036
LASTING MACHINE
Filed Dec. 20, 1949   20 Sheets-Sheet 6

Inventor
Bernhardt Jorgensen
By his Attorney

Dec. 22, 1953     B. JORGENSEN     2,663,036
LASTING MACHINE

Filed Dec. 20, 1949     20 Sheets-Sheet 8

*Inventor*
*Bernhardt Jorgensen*
*By his Attorney*

Dec. 22, 1953  B. JORGENSEN  2,663,036
LASTING MACHINE
Filed Dec. 20, 1949  20 Sheets-Sheet 10

Inventor
Bernhardt Jorgensen
By his Attorney

Dec. 22, 1953  B. JORGENSEN  2,663,036
LASTING MACHINE
Filed Dec. 20, 1949  20 Sheets-Sheet 11
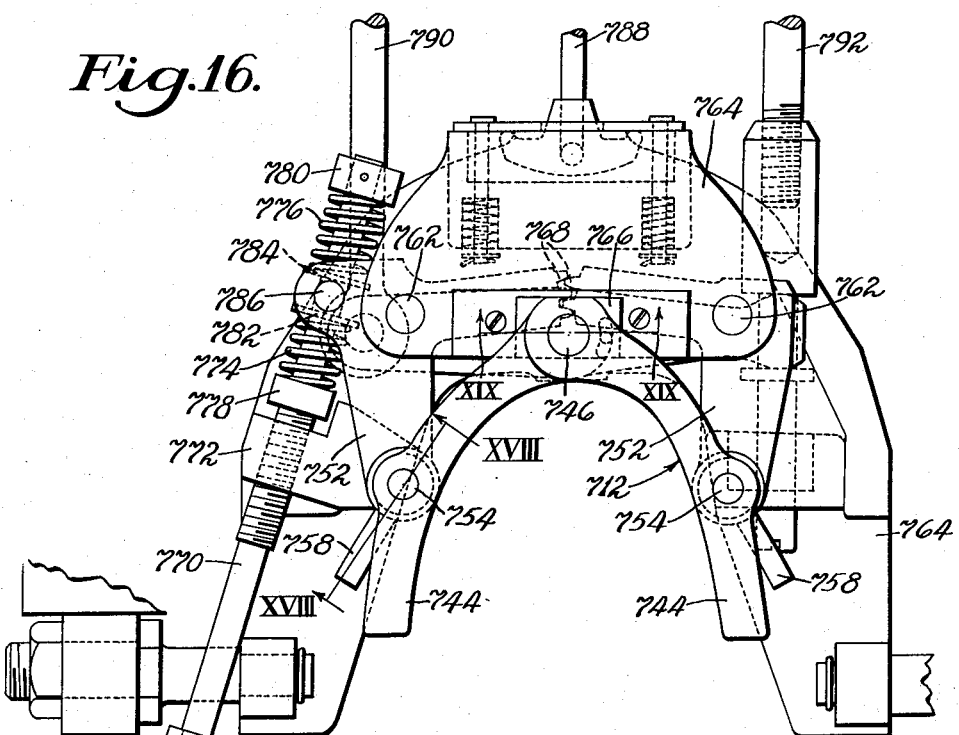
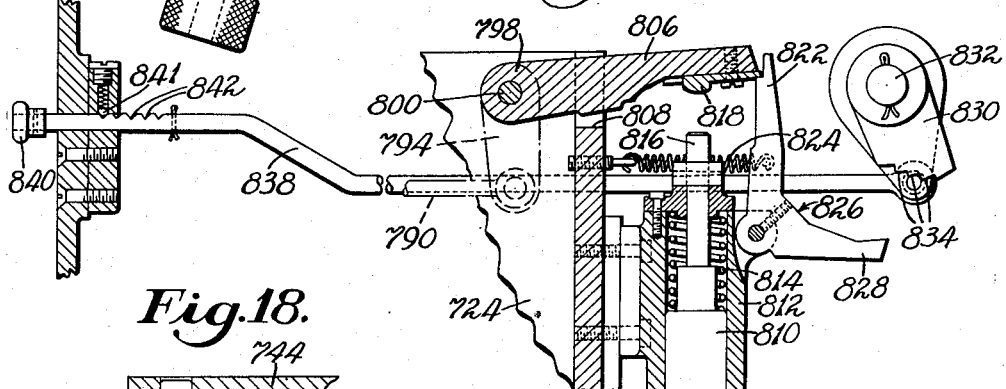
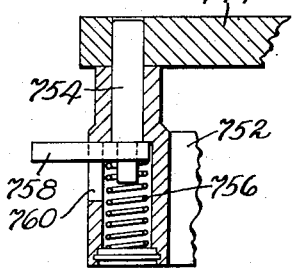
Inventor
Bernhardt Jorgensen
By his Attorney

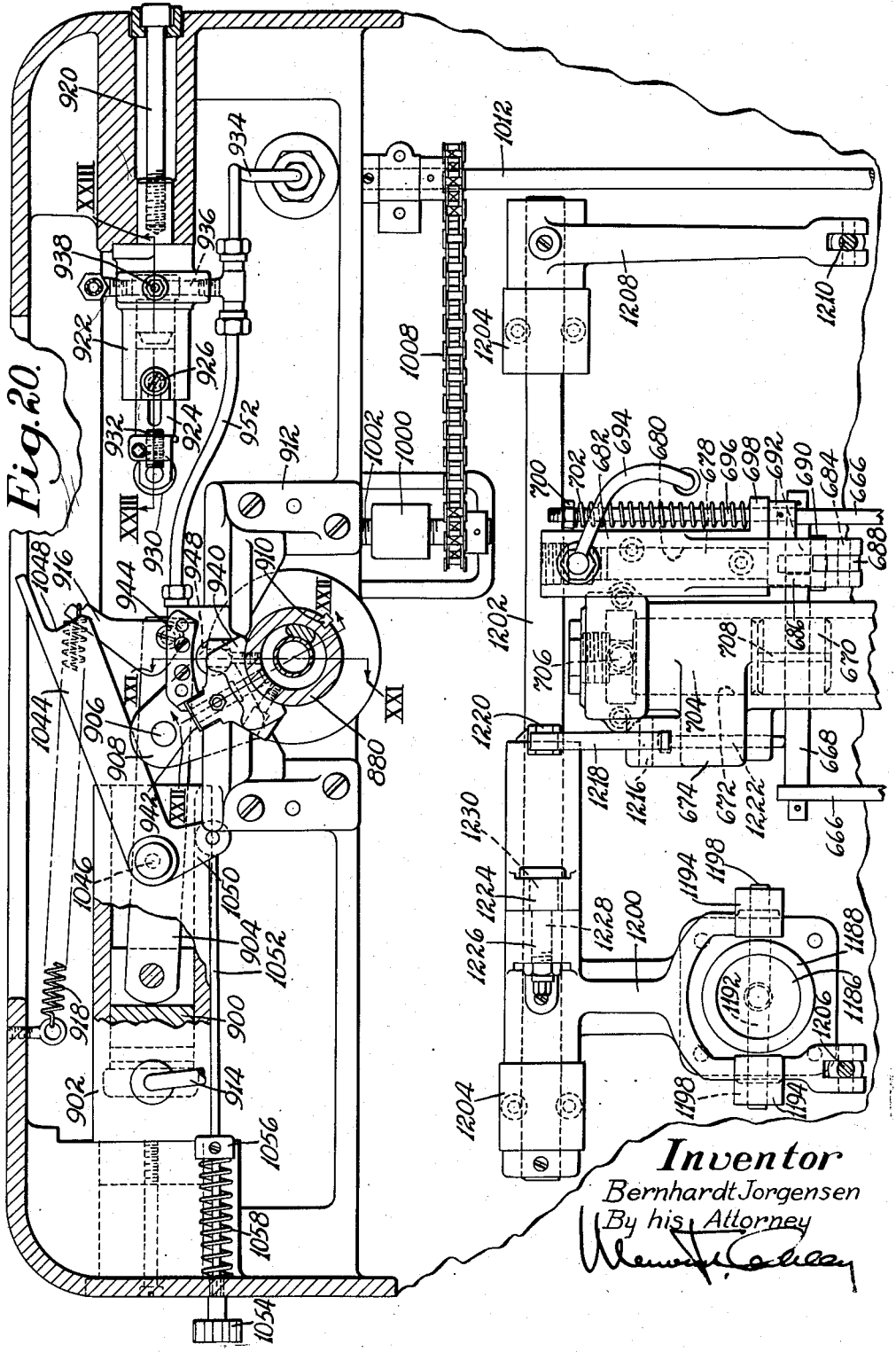

Dec. 22, 1953   B. JORGENSEN   2,663,036
LASTING MACHINE
Filed Dec. 20, 1949   20 Sheets-Sheet 13

Inventor
Bernhardt Jorgensen
By his Attorney

Dec. 22, 1953  B. JORGENSEN  2,663,036
LASTING MACHINE
Filed Dec. 20, 1949  20 Sheets-Sheet 14

Inventor
Bernhardt Jorgensen
By his Attorney

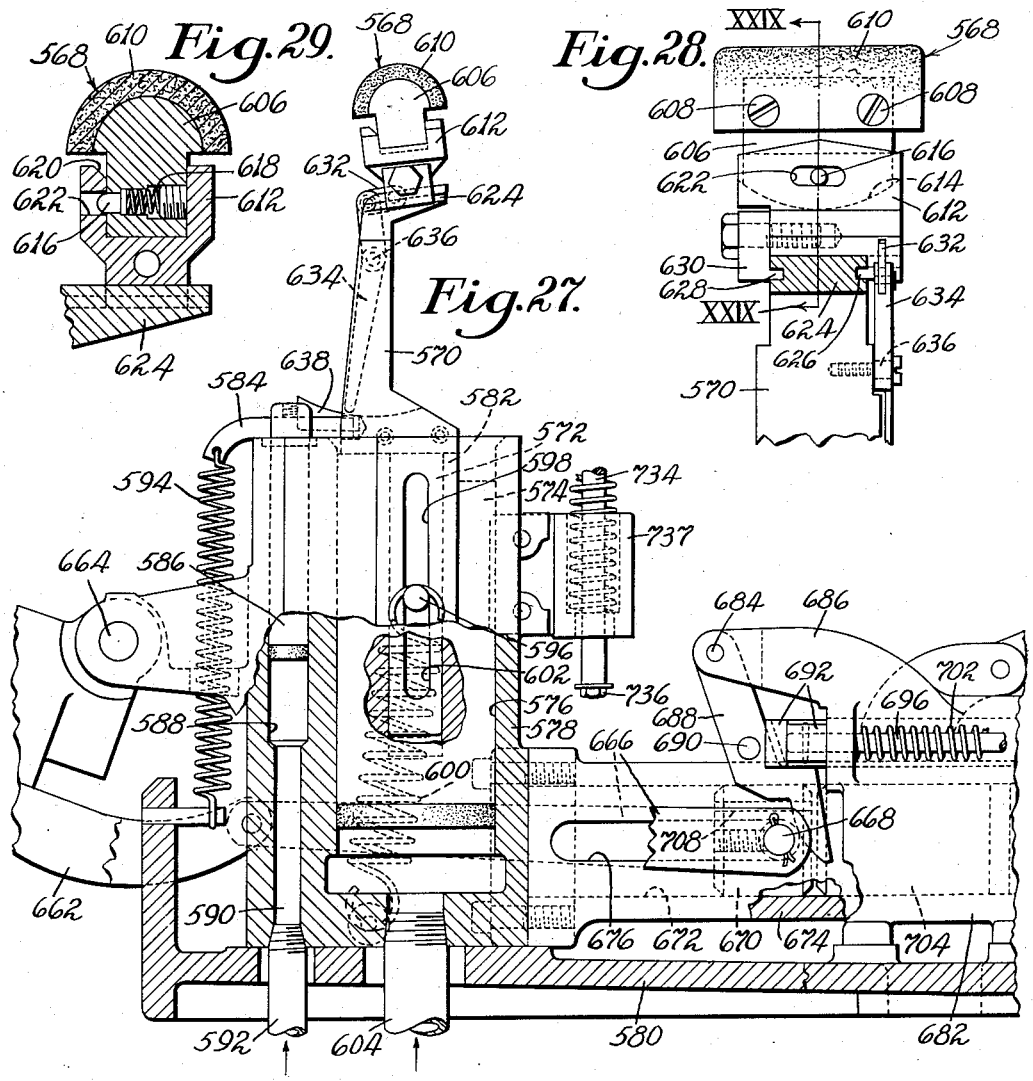

Dec. 22, 1953  B. JORGENSEN  2,663,036
LASTING MACHINE

Filed Dec. 20, 1949  20 Sheets-Sheet 16

*Inventor*
Bernhardt Jorgensen
By his Attorney

Dec. 22, 1953     B. JORGENSEN     2,663,036
LASTING MACHINE
Filed Dec. 20, 1949     20 Sheets-Sheet 17
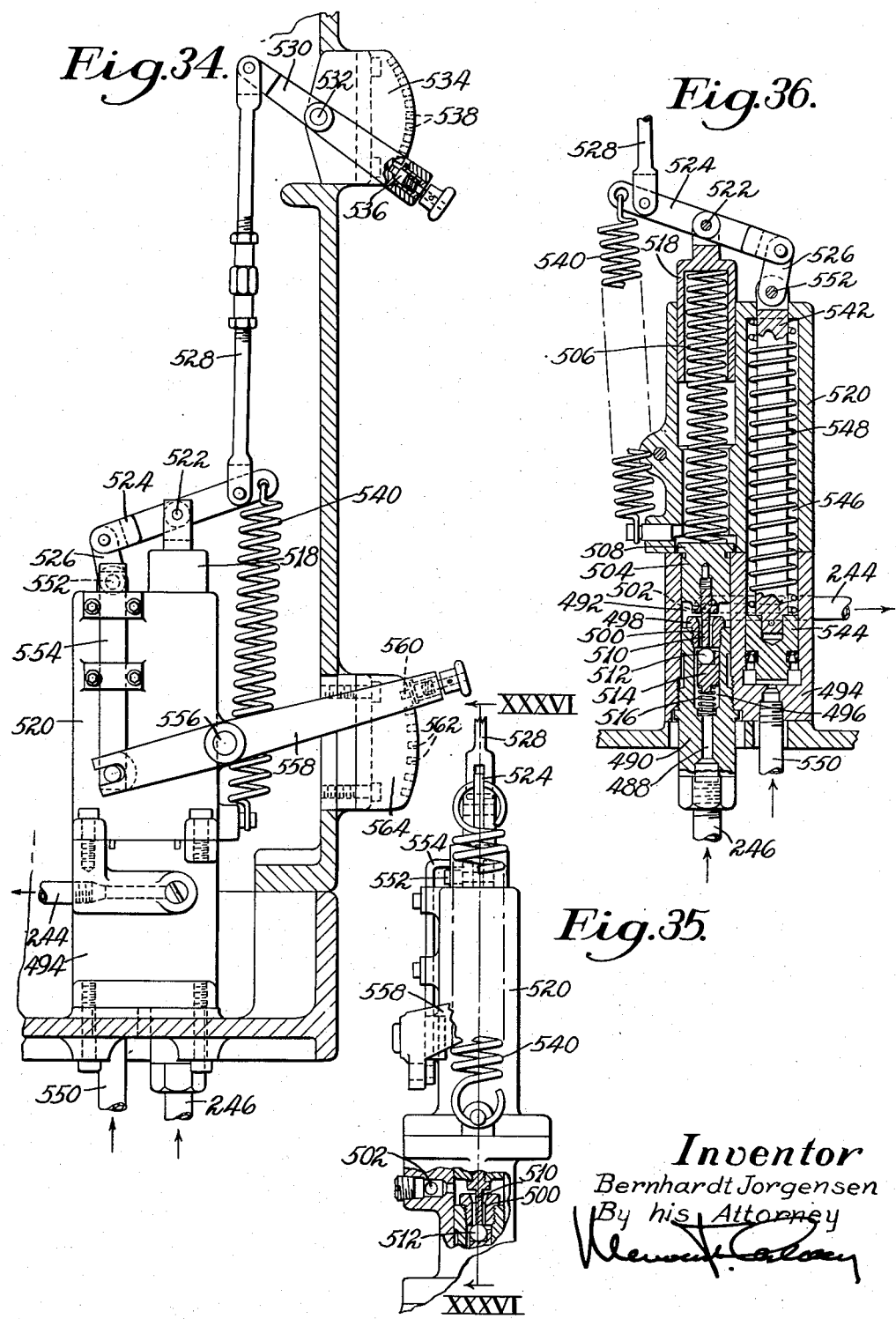
Inventor
Bernhardt Jorgensen
By his Attorney Inventor
Bernhardt Jorgensen
By his Attorney Dec. 22, 1953  B. JORGENSEN  2,663,036
LASTING MACHINE
Filed Dec. 20, 1949  20 Sheets-Sheet 19
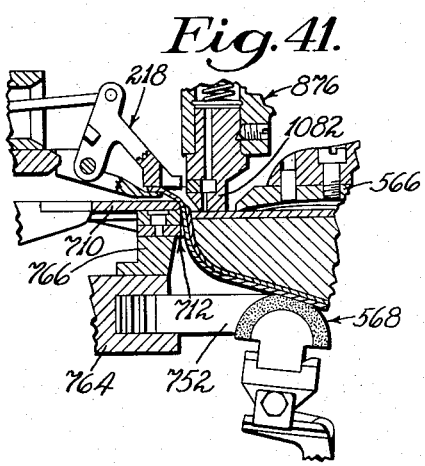
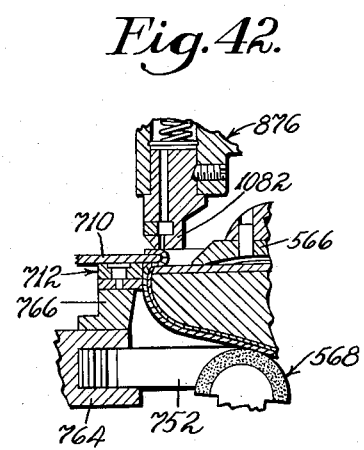
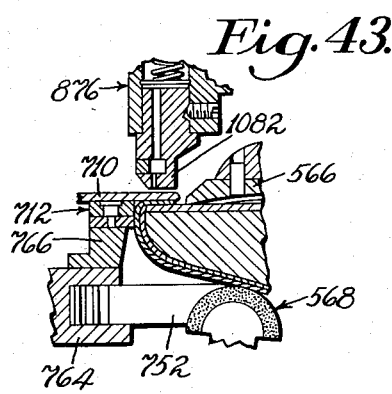
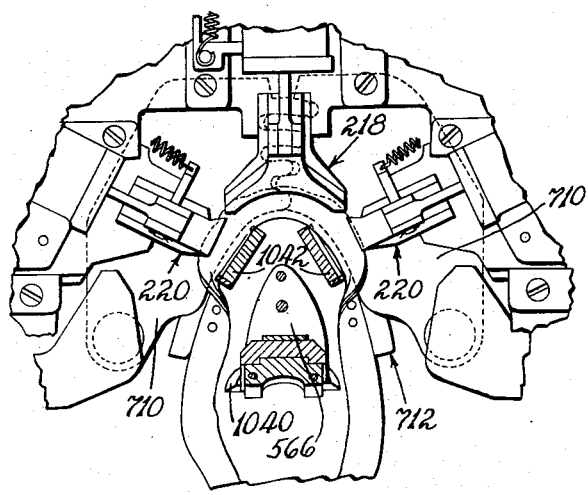
Inventor
Bernhardt Jorgensen
By his Attorney Dec. 22, 1953   B. JORGENSEN   2,663,036
LASTING MACHINE
Filed Dec. 20, 1949   20 Sheets-Sheet 20
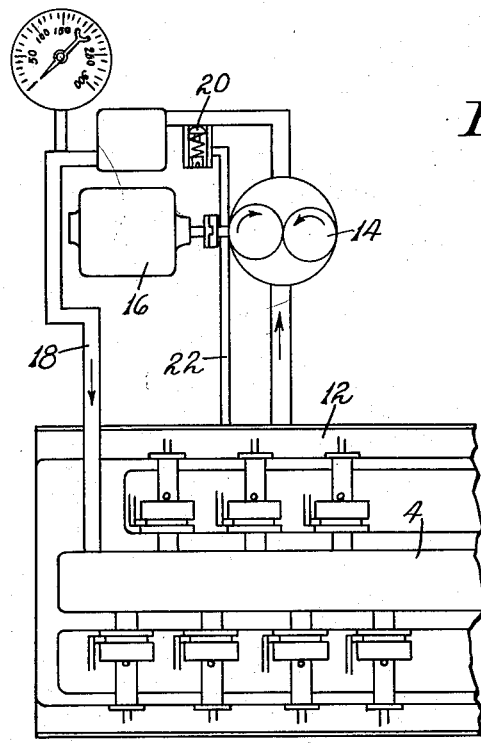
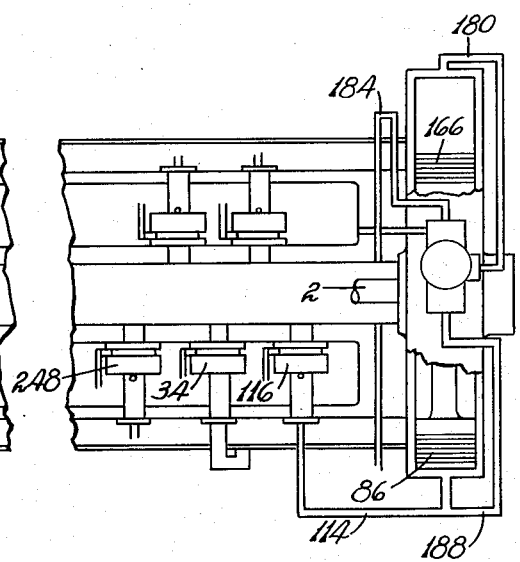
Fig.45.
*Inventor*
Bernhardt Jorgensen
By his Attorney Patented Dec. 22, 1953

2,663,036

UNITED STATES PATENT OFFICE 2,663,036

LASTING MACHINE

Bernhardt Jorgensen, Marblehead, Mass., assignor to United Shoe Machinery Corporation, Flemington, N. J., a corporation of New Jersey Application December 20, 1949, Serial No. 134,041

39 Claims. (Cl. 12—8.8)

This invention relates to lasting machines and has particularly in view the provision of certain improvements in a power-operated toe-lasting machine constructed generally as disclosed in United States Letters Patent No. 2,324,509, granted on July 20, 1943 on an application of mine, but modified in some respects as disclosed in Letters Patent No. 2,377,887, granted on June 12, 1945 on another application of mine and in other Letters Patent hereinafter mentioned. The invention is accordingly herein shown as applied to such a machine, but it will be understood that it is not thus limited in its applicability.

The above-mentioned machine to which the invention is herein shown as applied is provided with a toe rest and a heel rest which are moved into engagement wtih the shoe respectively on the top of the forepart and on its heel-end face to hold the shoe during the toe-lasting operation. Included among its operating instrumentalities are a toe former for conforming the toe-end portion of a multi-ply upper to the contour of the last by wiping it heightwise of the last, means for trimming the margins of all but the outer layer of the upper materials thus conformed to the contour of the last while leaving a margin of the outer layer to be lasted inwardly over an insole on the last next to the insole, and wipers for thereafter wiping the margin of the outer layer inwardly over the insole. The machine is also provided with grippers which grip the margins of the several layers of the upper at the end and the sides of the toe respectively, the end gripper being moved lengthwise of the last and the side grippers widthwise of the last to pull the upper in outward directions prior to the action of the toe former thereon and the several grippers holding the upper under tension as the toe former is operated to wipe the upper heightwise of the last. The grippers then hold the margin of the upper spread outwardly over the wipers preparatory to the upper-trimming operation which is performed by a plurality of outwardly movable trimming knives, the grippers releasing the upper prior to the completion of the upper-trimming operation and being retracted to avoid interference with the knives. Thereafter the upper is released also by the toe former and the operations of pulling it and of wiping it heightwise of the last are repeated, the grippers at this time acting only on the outer layer of the upper materials. Cement is then applied to the toe end of the shoe and the wipers are operated to wipe the margin of the outer layer inwardly over the insole into position to be secured to the insole by the cement. In this operation a portion of the cement-applying means acts as a retarder and is forced upwardly away from the insole by the pressure of the wipers and the margin of the upper thereon. While the wipers are holding the margin of the upper in overwiped position the machine comes automatically to a stop, after which it is again started to cause it to complete the cycle of operations and to return the parts to their initial positions. The different instrumentalities are operated in proper time relation to one another by fluid-pressure means to which fluid, preferably light oil, is delivered from a manifold where the fluid is maintained under pressure by a pump. The machine is controlled by a treadle in response to the first depression of which an outlet from the manifold is closed to cause the development of the required operating pressure therein by the pump and the grippers also are closed on the upper and in response to a second depression of which the cycle of operations is started.

One of the objects of the invention is to provide improved means for controlling the operation of the machine by the treadle. In the construction shown three valve-operating levers are mounted to swing about the same axis as the treadle lever, one to cause the closing of the grippers, another to cause the development of operating pressure in the manifold and the third to start the cycle of operations. In response to the first depression of the treadle a latch carried by the treadle lever operates the lever which causes the closing of the grippers, and this lever by its movement operates the lever which causes the development of operating pressure. In response to a second depression of the treadle after return movement thereof another latch on the treadle lever operates the lever which starts the cycle of operations, means being provided for rendering this latch inoperative when the treadle is first depressed. This latch serves further to start the machine again in response to a third depression of the treadle after the pause which occurs in the cycle, at which time the first-mentioned latch is prevented from acting on the lever which causes the closing of the grippers. The machine is also provided with another treadle which, by further control of the valves operated by the first-mentioned treadle, may be used to cause the opening of the grippers and the termination of operating pressure in the manifold prior to the starting of the cycle or, after such starting, additionally to cause the machine to stop instantly at any point in the cycle by reason of return movement of the starting valve. By still another controlling member the machine may be stopped at any point in the cycle without affecting the grippers or the pressure in the manifold.

The above-mentioned toe rest and heel rest have been moved heretofore into engagement with the shoe and forced firmly against the shoe shortly after the starting of the cycle of operations, and it has accordingly been necessary for the operator to support the shoe in his hands until after the second depression of the treadle to start the cycle. To permit the operator to release the shoe earlier, and especially to avoid any danger that one of his hands may be injured by being caught between the shoe and the toe rest or heel rest, the construction herein shown is such that these rests are moved into positions to engage the shoe with only comparatively light pressure in response to the first depression of the treadle prior to the starting of the cycle of operations and are forced more firmly against the shoe after the starting of the cycle. For thus moving each of the rests into engagement with the shoe there is provided a piston of comparatively small diameter movable in a cylinder to which fluid is admitted under control of the same valve which causes the grippers to close on the upper in response to the first depression of the treadle, and to force each rest more firmly against the shoe there is provided a piston of larger diameter which is operated after the starting of the cycle.

For wiping the toe end of the upper heightwise of the last the toe former is carried, as heretofore, by an upwardly movable wiper support which also carries the wipers for wiping the margin of the upper inwardly over the insole, and this wiper support is moved upwardly by a pair of fluid-operated pistons, the connections between the support and the pistons being such that when the wipers are operated to wipe the margin of the upper inwardly over the insole the support may move farther upward relatively to the pistons in response to pressure of the margin of the upper on the wipers to prevent the wipers from acting too severely on the upper. For better insurance against such action of the wipers on the upper, comparatively small pistons subject to the pressure of the operating fluid have been mounted heretofore in the larger pistons for partially counterbalancing the weight of the wiper support. In the construction herein shown counterbalancing pistons shorter than those used heretofore are mounted in the lower ends of the larger pistons and their upward movements are positively limited by the larger pistons. Springs, moreover, are provided for transmitting the force of the small pistons yieldingly to the wiper support, these springs being of such strength that the force applied by the small pistons is never great enough actually to raise the wiper support. Regardless, therefore, of any abnormally high pressure which may momentarily be developed in the manifold, the wiper support will never be raised by the fluid pressure beyond the position to which it is raised by the larger pistons. The importance of this arises from the fact that, as hereinafter more fully explained, in the machine herein shown check valves are provided for preventing return flow of any fluid to the manifold from the mechanisms operated by the fluid, and if the wiper support, therefore, were to be raised to an abnormally high position prior to the operation of the wipers it would remain in that position during the wiping operation.

The means for applying cement to the shoe includes a member arranged to engage the insole and from which cement is deposited on the insole, and this member is arranged to be forced upwardly away from the insole by pressure of the wipers and the upper thereon as the wipers wipe the margin of the upper inwardly over the insole. The member thus acts as a retarder on the margin of the upper until the latter is withdrawn from between it and the top faces of the wipers near the end of the wiping operation. The wipers are provided, as heretofore, with a plurality of curved interlocking fingers to avoid any V-shaped opening between them at the end of the toe when they are in their closed positions, and it is desirable to prevent any cement from entering the recesses in which these fingers are located. Mechanism, therefore, is provided for preventing the above-mentioned cement-applying member from engaging the wipers when the margin of the upper is withdrawn from between it and the wipers. This mechanism, in the construction shown, comprises a latch which automatically holds the member at the height to which it was moved by the pressure of the wipers and the upper thereon until the time when the cement-applying means is withdrawn from the shoe, at which time the latch is moved to an inoperative position.

To improve the action of the toe former and to render it more readily conformable than heretofore to shoes of different sizes, it comprises, in the construction herein shown, a pair of toe-embracing members of rigid material which are curved in accordance with the style of the shoes on which the machine is to operate and are pivotally connected together for swinging movements toward or from each other. These members are so controlled as to swing toward each other in response to pressure of the end of a toe thereon or away from each other in response to pressure of the sides of a toe thereon, so that they will readily adjust themselves to each shoe. Such movements of the members are yieldingly resisted respectively by different springs, and an adjusting device is arranged to act through these springs to adjust the members preliminarily toward or from each other.

The invention further provides means whereby the cycle of operations of the machine may, if desired, be changed to cause the grippers and the toe former, instead of acting on the upper twice in the cycle before and after the upper-trimming operation, to act only once in the cycle prior to that operation. As illustrated, this is accomplished by shifting as a unit a plurality of valve-controlling cams with which the machine is provided.

The above and other features of the invention, including various novel details of construction and combinations of parts, will now be more particularly described with reference to the accompanying drawings and thereafter pointed out in the claims.

In the drawings,

Fig. 2 shows the upper portion of the machine in right-hand side elevation, with parts broken away;

Fig. 4 is mainly a section on the line IV—IV of Fig. 3, with parts broken away;

Fig. 5 is a perspective view of a portion of the structure shown in Fig. 4;

Fig. 6 is a section on the line VI—VI of Fig. 3;

Fig. 7 is a section on the line VII—VII of Fig. 3;

Fig. 8 is a section on the line VIII—VIII of Fig. 3;

Fig. 9 is a view generally similar to Fig. 7 of a portion of the structure, with the parts differently positioned, but showing in its upper portion parts which appear in Fig. 6;

Fig. 16 is a plan view of the toe former and its controlling means positioned below the wipers;

Fig. 17 is mainly a section on the line XVII—XVII of Fig. 15;

Fig. 18 is a section on the line XVIII—XVIII of Fig. 16;

Fig. 19 is a section on the line XIX—XIX of Fig. 16;

Fig. 20 is mainly a plan view of a portion of the structure located near the bottom of Fig. 2, with parts broken away;

Fig. 27 is a view partly in right-hand side elevation and partly in section, showing the toe rest and its operating means and also a portion of the means for operating the heel rest;

Fig. 28 shows the toe rest as viewed from the right-hand side of Fig. 27, with a portion of its supporting means in section;

Fig. 29 is a section on the line XXIX—XXIX of Fig. 28;

Fig. 30 is a view similar to the upper portion of Fig. 27 of an alternative form of toe rest;

Fig. 31 shows the alternative toe rest as viewed from the right with reference to Fig. 30, with parts in section;

Fig. 34 is a view mainly in left-hand side elevation of the valve means for controlling the pressure of the fluid acting to close the grippers on the upper;

Fig. 35 is a view on a smaller scale of the structure shown at the lower portion of Fig. 34 as viewed from the right with reference to that figure, with parts broken away;

Fig. 36 is a section on the line XXXVI—XXXVI of Fig. 35 on an enlarged scale;

Figs. 38 to 43 inclusive are vertical sectional views showing parts as they appear at different times in the course of the operation of the machine;

Fig. 44 is mainly a plan view showing the shoe and certain parts as they appear immediately prior to the upper-trimming operation; and Fig. 45 is a diagrammatic view illustrating generally how the fluid pressure is generated and controlled.

Figure 3:
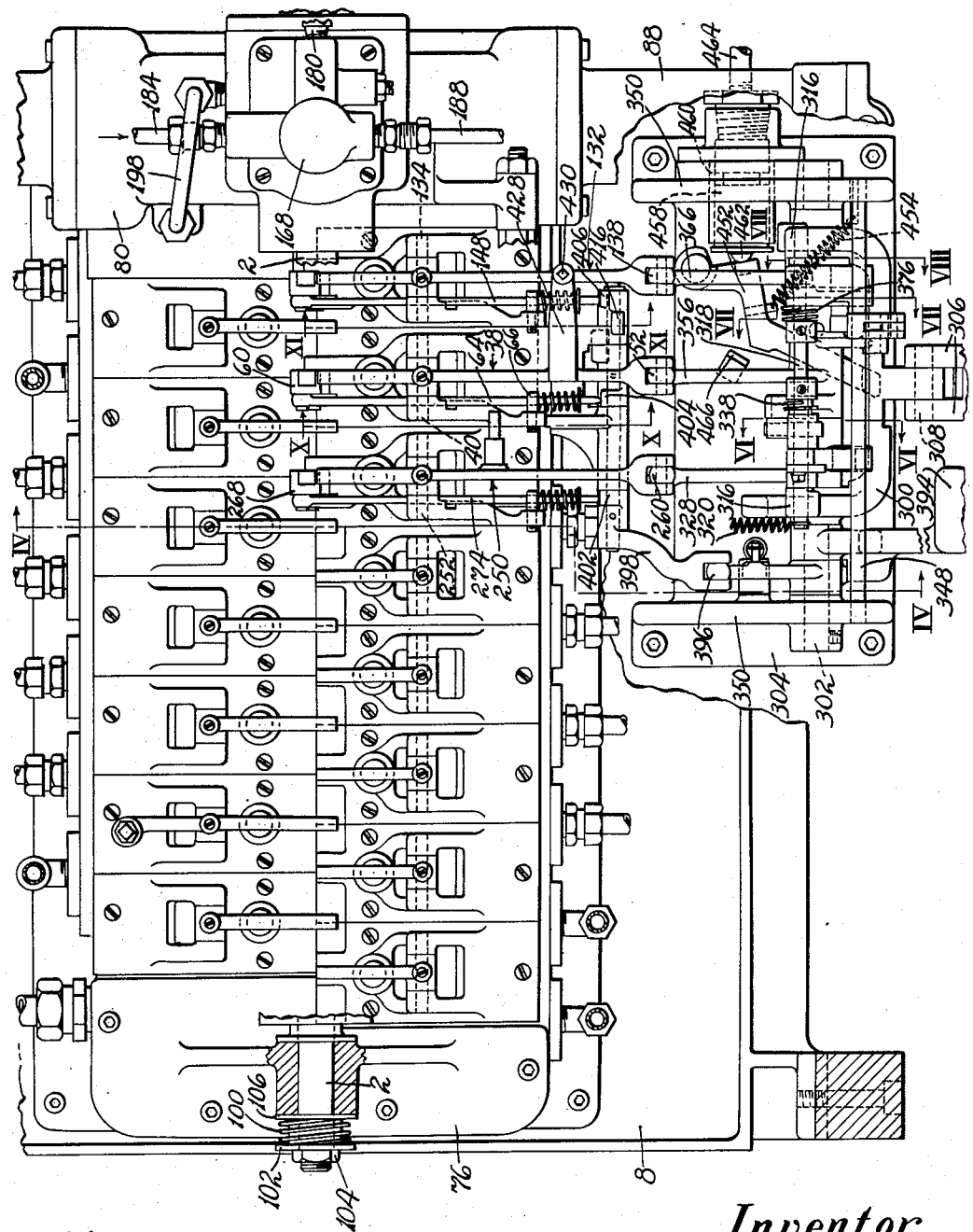
Fig. 3 is mainly a plan view of valve-controlling means in the lower portion of the machine.

In general accordance with the disclosure of Letters Patent No. 2,324,509, the machine herein shown includes in its organization a plurality of fluid-operated mechanisms which are thus operated in predetermined time relation to one another in the course of a cycle of operations of the machine. The delivery of operating fluid, preferably light oil, to the several mechanisms and the release of the fluid therefrom are effected by a plurality of valves, as more particularly hereinafter described, these valves being controlled in the construction herein shown by cams some of which are hereinafter specifically identified. These cams are fast on a shaft 2 (Figs. 3 and 13) one complete revolution of which corresponds to the cycle of operations. The fluid is thus delivered by the valves from a chamber or manifold 4 (Figs. 4 and 12) formed in a casting 6 which is mounted on a plate 8 secured to the frame of the machine, and below this plate is a casting 10 which provides a reservoir or sump 12 for fluid not under pressure. As illustrated diagrammatically in Fig. 45, a pump 14 driven continuously by an electric motor 16 draws fluid from the sump 12 and delivers it through a pipe 18 into the manifold 4 to provide the necessary pressure in the manifold, the maximum pressure being determined by a spring-controlled relief valve 20 past which the excess fluid delivered by the pump flows through a by-pass 22 back to the sump.

Figures 1, 1A:
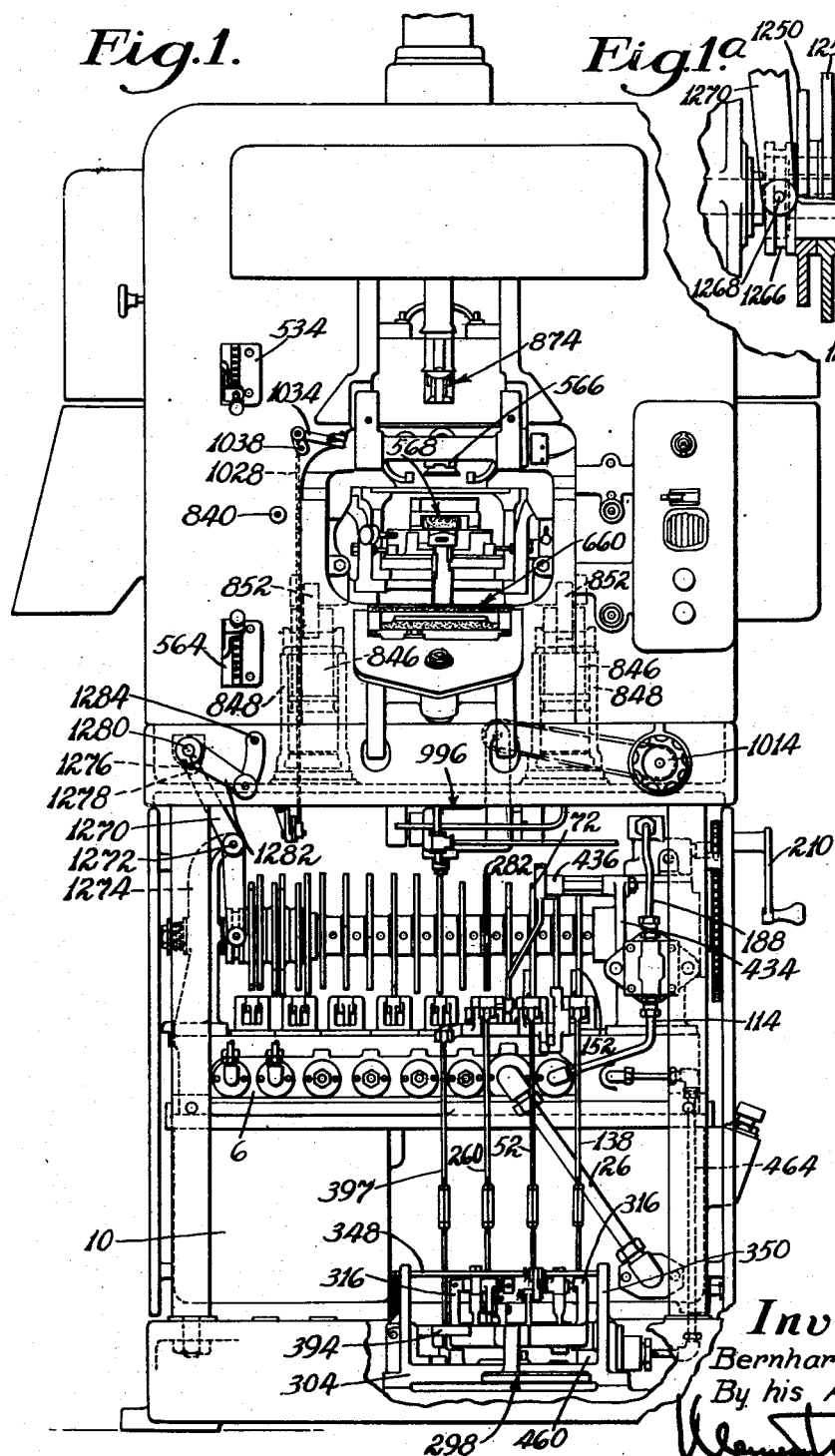
Fig. 1 is a view in front elevation of the machine in which the invention is herein shown as embodied.
Fig. 1a is a detail front view on a larger scale of a portion of the structure shown in Fig. 1, with parts broken away.
Figure 10:
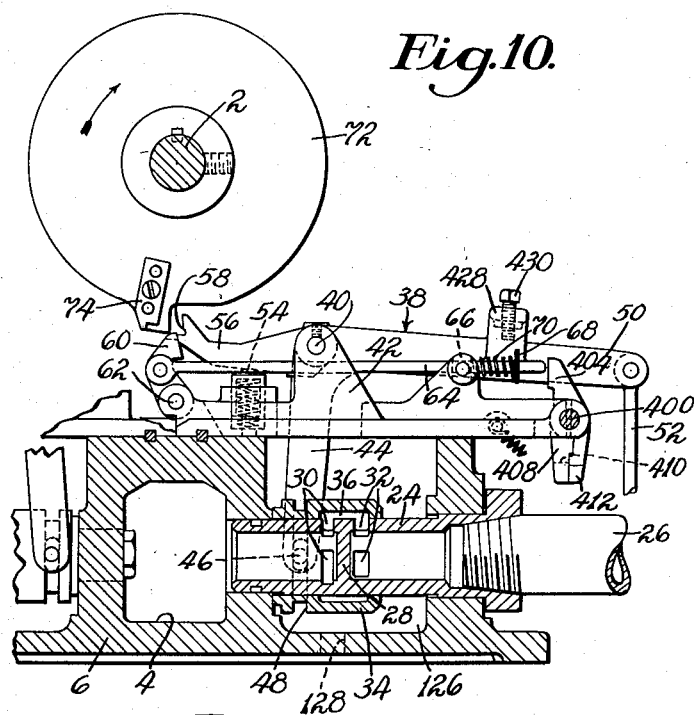
Fig. 10 is a section on the line X—X of Fig. 3.

In order to save power when the machine is not performing a cycle of operations provision is afforded at that time for the escape of fluid from the manifold 4 without the development of full pressure in the manifold. For this purpose there is mounted in the casting 6 (Fig. 10) a tube 24 one end of which is in communication with the manifold and the other end with a pipe 26 (Fig. 1) leading to the sump 12. This tube is provided between its opposite ends with a partition 28, and extending through it at one side of the partition are ports 30 and at the other side of the partition ports 32. Slidingly mounted on the tube is a sleeve valve 34 having therein an annular recess 36 through which the ports 30 and 32 are in communication with one another when the valve is in the initial position shown in Fig. 10, thus providing an outlet from the manifold to the sump. The valve is movable toward the right with reference to Fig. 10 into position to cover the ports 30 and thus to cause the development of the full pressure in the manifold. For this purpose there is provided a three-armed lever 38 fast on a pin 40 rotatable in bearings in a casting 42 which is secured on the top of the casting 6, a downwardly extending arm 44 of this lever having thereon a pin 46 extending into a groove 48 in the valve. Pivotally connected to a second arm 50 of the three-armed lever is a downwardly extending link 52 by upward movement of which the valve is operated as above described to close the ports 30. The means for thus operating the link 52 will be hereinafter described. The three-armed lever is operated by the link 52 against the resistance of a spring-pressed plunger 54 which is mounted in the casting 42 and presses upwardly against a third arm 56 of the lever. Formed in the end of this arm is a notch 58 arranged to receive a latch 60 to hold the lever in the position to which it is moved by the link 52. This latch is pivotally mounted at 62 on the casting 42 and pivotally connected to it is a rod 64 which extends through a guide member 66 (see Fig. 3) pivotally mounted on an upwardly extending arm of the casting 42. Between this member and a flange 68 on the rod 64 is a spring 70 by which the latch 60 is moved into the notch 58 into position to hold the lever 38. To cause the valve 34 to be returned by the spring plunger 54 into position to release the fluid from the manifold 4 at the end of the cycle of operations, a cam 72 secured to the control shaft 2 has fast thereon a small plate 74 arranged to engage the latch 60 and to move it out of the notch 58, this plate being carried beyond the latch just before the shaft 2 comes to a stop to permit the latch to be moved by the spring 70 into engagement with the end of the arm 56 as shown in Fig. 10.

The shaft 2 which carries the valve-controlling cams is mounted at one end (Fig. 3) in a bearing formed in a casting 76 supported on the casting 6. At its other end (Fig. 13) the shaft is supported by a ball bearing 78 in a recess formed in a casting 80 fast on the casting 6, and at this end the shaft is coupled by a tongue-and-groove connection 82 to a short shaft 84 rotatable in the casting 80 and in a member 81 on the casting. The shaft 2 is turned in the direction of the arrow $a$ (Fig. 12) by a fluid-operated piston 86 mounted in a cylinder 88 secured to the casting 80. To turn the shaft in that direction there is provided a one-way Horton clutch 90 comprising a member 92 keyed to the shaft 84 and an annular member 94 encircling the member 92. Mounted in recesses in the member 92 are rolls 96 controlled by springs 98 and serving to couple the member 92 to the member 94 when the member 94 is turned in the direction of the arrow $a$ but to permit the member 94 to turn freely in the reverse direction on the member 92. To prevent the shaft 2 from being turned in the reverse direction there is mounted on one end of the shaft (Fig. 3) a spring 100 which is under compression between a washer 102 confined by a nut 104 on the end of the shaft and another washer 106 in frictional engagement with a flat face on the casting 76. The annular clutch member 94 has on its periphery a series of gear teeth 108 in engagement with rack teeth 110 formed on a piston rod 112 to one end of which the piston 86 is secured, the piston rod being located below the clutch.

Figure 11:
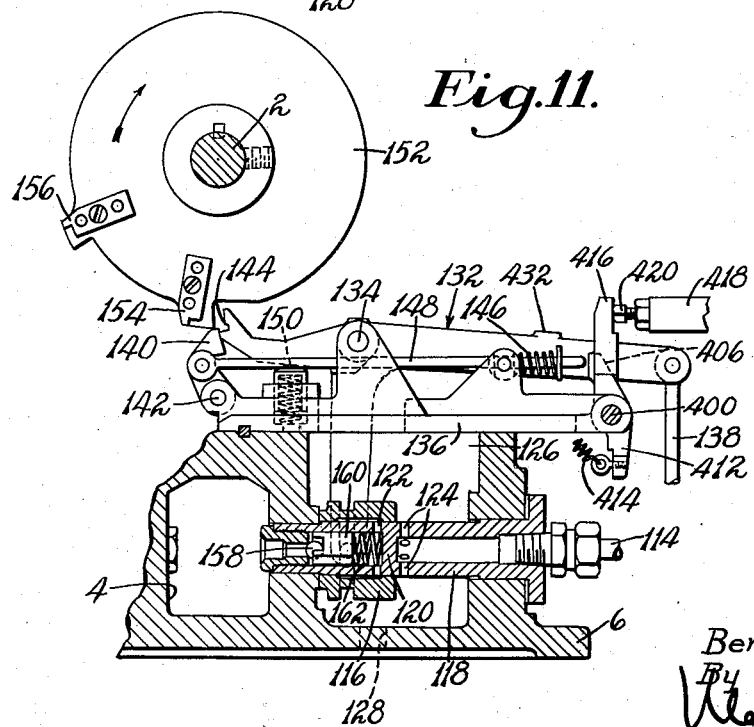
Fig. 11 is a section on the line XI—XI of Fig. 3.

Fluid is admitted to the cylinder 88 to operate the piston 86 and is thereafter released therefrom through a pipe 114 (Figs. 1 and 12) communicating with one end of the cylinder, the admission and release of the fluid being controlled by a valve 116 (Fig. 11). This valve is a sleeve valve similar in construction to the previously mentioned valve 34 shown in Fig. 10 and is slidingly mounted on a tube 118 arranged to communicate at one end with the pipe 114 and at the other end with the manifold 4. Similarly to the tube 24 shown in Fig. 10, the tube 118 has therein a partition 120 and has ports 122 and 124 extending through it at opposite sides, respectively, of the partition. As distinguished from the valve 34, the valve 116 is initially in a closed position, as shown in Fig. 11, the ports 124 which are in communication with the pipe 114 being open to a chamber 126 formed in the casting 6. This chamber communicates through openings 128 (Fig. 4) in the casting 6 with a chamber 129 between this casting and the plate 8 and the latter chamber communicates through openings 130 in the plate 8 with the sump 12 underneath. To admit fluid from the manifold 4 to the cylinder 88 the valve 116 is moved toward the right with reference to Fig. 11 by valve-operating means of substantially the same construction as the means previously described for operating the valve 34. That is, there is a three-armed lever 132 pivotally mounted at 134 on a casting 136, one arm of this lever being pivotally connected to a link 138 by upward movement of which the valve is moved into position to provide communication between the ports 122 and 124. The means for thus operating the link 138 will be hereinafter described. To retain the valve in this position a latch 140 pivotally mounted at 142 on the casting 136 is arranged to enter a notch 144 formed in one arm of the lever 132, the latch being moved into the notch by a spring 146 and a rod 148 in the same manner as the latch 60 for controlling the lever 38 shown in Fig. 10. When the latch 140 is moved out of the notch 144 the valve 116 is returned into position to release the fluid from the cylinder 88 by a spring-pressed plunger 150 engaging one arm of the lever 132. For thus operating the latch to stop the rotation of the control shaft 2 at the end of the cycle a cam 152 fast on the control shaft has secured thereon a small plate 154 arranged to engage the latch. To bring the machine to a stop prior to the end of the cycle, the cam 152 has thereon another small plate 156 arranged to act on the latch 140 earlier than the plate 154. In the construction herein shown there is mounted within the tube 118 a ball check valve 158 for preventing any return flow of the fluid into the manifold 4 if the pressure drops in the manifold. Mounted also in the tube is a valve cage 160 and a spring 162 arranged to act on the cage to hold the valve in closed position except when fluid is passing from the manifold into the pipe 114.

Whenever the valve 116 is returned in the manner above described into position to release the fluid from the cylinder 88, whether at the end of the cycle or prior to the end of the cycle, the piston 86 is returned to its initial position. For this purpose a cylinder 164 (Fig. 12) is secured to the casting 80 at the opposite side of the casting from the cylinder 88 and in alinement with the latter cylinder. Mounted in the cylinder 164 is a piston 166 fast on the opposite end of the piston rod 112 from the piston 86. Mounted in a block 168 fast on the upper end of the casting 80 is a vertically movable piston valve 170 (Fig. 13) held normally in upraised position by a spring 172 which is mounted in a recess in the valve and is seated at its lower end on a plate 174 fast on the block. The valve is provided with an annular recess 176, and when it is in its normal upraised position, as shown, this annular recess is in communication, through a passageway 178 in the block 168, with a pipe 180 leading to the outer end of the cylinder 164. Also in communication with the annular recess in the valve is a passageway 182 in the block 168, this passageway being connected by a pipe 184 with the manifold 4. Initially, therefore, the cylinder 164 is in communication with the manifold through the pipe 184, the annular recess 176 in the valve and the pipe 180 and contains fluid under the same pressure as that in the manifold.

Leading from the cylinder 88 to a port 186 in the upper end of the block 168 is a pipe 188, the port 186 communicating with an annular recess 190 in the block around the upper end of the valve 170 when the valve is in its uppermost position. When the valve 116, therefore, is moved into position to admit fluid under pressure from the manifold to the cylinder 88 the same pressure is established through the pipe 188 in the annular recess 190 and forces the valve 170 downwardly against the resistance of the spring 172, the valve engaging the plate 174 to limit its downward movement. This downward movement of the valve closes the passageway 178 and thus interrupts communication between the manifold and the cylinder 164. Extending downwardly in the block 168 from the passageway 178 is another passageway 192 in communication at its lower end with a chamber 194 in the casting 80, this being a chamber in which the clutch 90 is located. Adjustably threaded in the block 168 is a needle valve 196 which partially closes the passageway 192 but permits restricted flow of the fluid from the passageway 178 to the chamber 194. Accordingly, when the piston 86 is operated by the fluid admitted to the cylinder 88 fluid is forced out of the cylinder 164 by the piston 166, this fluid flowing through the pipe 180 and the restricted passageway 192 into the chamber 194. Leading from the upper portion of this chamber is a pipe 198 for conducting fluid therefrom back to the sump. This pipe extends first upwardly and then downwardly to form a loop high enough to insure that the chamber 194 and the passageways 178 and 192 will be at all times full of fluid. It will be understood that the needle valve 196 restricts, as determined by its adjustment, the flow of the fluid from the cylinder 164 when the piston 86 is operated and thereby determines the speed at which the control shaft 2 is rotated. It will further be understood that when the valve 170 is in its initial upraised position a small quantity of the fluid conducted by the pipe 184 from the manifold to the passageway 182 and the annular recess 176 in the valve will escape past the needle valve 196 to the chamber 194.

When the valve 116 is moved reversely into position to release the fluid from the cylinder 88, the drop in the pressure above the valve 170 causes the valve to be returned to its initial position by the spring 172. In this manner communication is again established through the pipes 184 and 180 between the manifold and the cylinder 164, so that the fluid under pressure is forced into this cylinder to act on the piston 166 and thereby to return the piston 86 to its initial position. In this operation, as hereinbefore explained, the annular clutch member 94 turns idly about the member 92, the control shaft 2 remaining stationary. Since the flow of the fluid from the manifold to the cylinder 164 and the flow of the fluid from the cylinder 88 back to the sump are unrestricted, the piston 86 is returned very quickly to its initial position. In view of the fact that the valve 34 is moved into position to release the fluid from the manifold 4 substantially at the time when the valve 116 is moved into position to release the fluid from the cylinder 88, as will be evident by reference to Figs. 10 and 11, the outlet from the manifold controlled by the valve 34 is sufficiently restricted as compared with the capacity of the pump 14 to insure that enough residual pressure will be maintained in the manifold to return the piston 86 at that time, only a small amount of pressure being required for that purpose.

Novel features of the means above described for operating the control shaft 2 and for returning the piston 86 are claimed in Letters Patent No. 2,585,131, granted on February 12, 1952 on an application of mine.

It may be desired at times, as for test purposes, to rotate the control shaft 2 by hand. Accordingly, the shaft 84 has fast thereon a sprocket wheel 200 connected by a chain 202 to a sprocket wheel 204 fast on a short shaft 206 which is rotatable in a bracket 208 on the frame. Loosely mounted on this shaft is a hand crank 210 having therein a notch 212 for connecting it to a pin 214 on the shaft when the crank is moved inwardly along the shaft. A snap ring 216 mounted in a groove on the end of the shaft is arranged to engage a shoulder on the hub of the crank to retain the crank on the shaft. It will be understood that when the shaft 2 is operated by the fluid the shaft 206 is rotated idly by the sprocket wheels and the chain.

Included in the organization of the machine is means for gripping the margin of the toe end of the upper and for pulling the upper in the course of the toe-lasting operation, substantially as disclosed in Letters Patent No. 2,324,509. This upper-pulling means comprises a toe-end gripper 218 (Fig. 14) for gripping the upper at the end of the toe and for pulling it lengthwise of the last and side grippers 220 for gripping it at the opposite sides of the toe and for pulling it widthwise of the last. The end gripper is mounted on a cylinder 222 in which is a piston 224 connected to one of the gripper jaws for closing the gripper on the upper, and similarly each of the side grippers is mounted on a cylinder 226 in which is a piston 228 for closing the gripper. Each of the cylinders 226 is connected by a flexible tube 230 to a passageway 232 formed in a junction block 234, the passageways in the two junction blocks being connected together by a pipe 236. The passageway in the right-hand block is in communication through a pipe 238 with a passageway formed in a block 240, and this passageway is in communication through a flexible tube 242 with the interior of the cylinder 222. The passageway 232 in the left-hand junction block 234 is in communciation with a pipe 244 through which fluid is supplied for closing the several grippers from pressure-controlling means (Fig. 34) hereinafter described, and fluid is supplied to the pressure-controlling means through a pipe 246 (Fig. 4) from the manifold 4 under control of a valve 248. This valve is like the valve 116 shown in Fig. 11 and is operated and controlled by mechanism of the same construction as that associated with the valve 116. That is, a three-armed lever 250 is pivotally mounted at 252 on a casting 254 which is supported on the casting 6, the lever being provided with a downwardly extending arm 256 connected to the valve and an arm 258 to which is pivotally connected a downwardly extending link 260. Accordingly, in response to upward movement of the link 260, effected by means hereinafter described, the valve 248 is moved into position to admit fluid to the pipe 246 by establishing communication between ports 262 and other ports 264 formed in a tube 266 on which the valve is slidingly movable. For retaining the valve in this position there is provided means like that shown in Fig. 11 for similarly retaining the valve 116, comprising a latch 268 arranged to enter a notch 270 formed in one arm 272 of the lever 250, the latch being controlled by a rod 274 and a spring 276 like corresponding parts shown in Fig. 11. A ball check valve 278 prevents any return flow of fluid from the pipe 246 to the manifold 4. At a predetermined time in the cycle of operations the latch 268 is engaged and moved out of the notch 270 by a cam plate 280 adjustably mounted on a cam 282 fast on the control shaft 2. Just before the latch is thus displaced, however, a lateral projection 284 on the cam plate 280 which extends over the periphery of the cam 282 arrives in position to engage the rear end of the arm 272 and thus to prevent such movement of the lever 250 as to return the valve 248 even though the latch is displaced. Such return of the valve to cause the opening of the grippers takes place at the time when a drop 286 on the projection 284 arrives in a position over the end of the arm 272. It will be understood that by adjustment of the cam plate 280 relatively to the cam 282 the time of such release of the upper by the grippers may be varied.

In accordance with the disclosure of Letters Patent No. 2,377,887, and as more fully hereinafter described, provision is afforded in the machine herein shown for operating the grippers to pull the upper twice in the cycle of operations, first to pull the several layers of the upper materials prior to the trimming of the marginal portions of all but the outer layer, as illustrated in Fig. 38, and again after the trimming operation to pull the outer layer only, as illustrated in Fig. 41. Accordingly, the cam 282 has thereon a rise 288 arranged to engage the arm 272 of the lever 250 and thereby to move the valve 248 into position to cause the grippers to grip the upper the second time. To determine variably the time when the grippers thereafter release the upper there is adjustably mounted on the cam 282 a second cam plate 290 having thereon a lateral projection which extends into a lateral recess 292 formed in one side of the cam 282, this lateral projection being arranged to engage the arm 272 and thus to hold the lever 250 against return movement after a drop 294 on the cam 282 has passed beyond the end of the arm. The lever 250 is released to cause the return of the valve 248 when a drop 296 at the end of the lateral projection on the cam plate 290 passes beyond the end of the arm 272. After the latch 268 has been displaced as above described by engagement of one end of the cam plate 280 therewith it has no further function throughout the cycle, since the lever 250 is controlled directly by the cam means acting thereon. Between the two cam plates 280 and 290, however, there is a space which results in a momentary release of the latch by the plate 280 before it is engaged and displaced again by the plate 290. This plate finally releases the latch to permit it to be returned by the spring 276 into engagement with the end of the arm 272 as illustrated in Fig. 4.

For controlling the operation of the machine there is provided a treadle 298 (Figs. 1 and 4) by the first depression of which the valve-operating links 52 and 260 are moved upward simultaneously to cause the development of operating pressure in the manifold 4 and the closing of the grippers on the upper and by a second depression of which the valve-controlling link 138 is moved upwardly to initiate the operation of the control shaft 2 and thus to start the cycle of operations. The treadle comprises a U-shaped lever 300 (Fig. 3) the two arms of which are pivotally mounted on a rod 302 (Figs. 4 and 6) supported by a casting 304 at the base of the machine, and an arm 306 arranged to be engaged by the operator's foot and pivotally mounted at 308 on the lever 300. Threaded in the arm 306 is a screw 310 the head of which is arranged to engage the lever 300 to determine adjustably the height of the arm. To limit the depression of the treadle the U-shaped lever 300 has thereon a projection 312 (Fig. 8) arranged to engage a shoulder 314 formed on the casting 304. The U-shaped lever has thereon a pair of upwardly extending arms 316, and extending between the upper ends of these arms and supported thereon is a rod 318 connected to which is a spring 320 for holding the lever initially in a position determined by the engagement of a projection 322 thereon with a stop 324 formed on the casting 304. Freely mounted on the rod 302 is a three-armed lever 326, a rearwardly extending arm 328 of which is pivotally connected to the lower end of the link 260 through which the valve 248 (Fig. 4) is operated to cause the grippers to close on the upper. Pivotally mounted on the rod 318 is a latch 330 provided with a shoulder 332 which by engagement with a block 334 fast on another arm 336 of the three-armed lever 326 moves this lever in a counterclockwise direction with reference to Fig. 6 in response to depression of the treadle to impart upward valve-operating movement to the link 260. Obviously the block 334 may be considered a part of the lever 326. The latch 330 is held normally down on the block 334 by a torsion spring 338 (Fig. 3) which is mounted on the rod 318 and is connected to a pin 340 mounted on a downwardly extending arm 342 integral with the latch. To insure that the valve 248 will not be moved by the treadle beyond its fully open position in which it is retained by the latch 268 (Fig. 4), an upwardly extending arm 344 on the latch 330 has adjustably mounted thereon a plate 346 arranged to engage a rod 348 which is supported in a pair of upward extensions 350 of the casting 304. A screw-and-slot connection 352 between the arm 344 and the plate 346 permits the plate to be adjusted in such manner that it will be engaged by the rod 348 to lift the latch 330 and thus to disengage the shoulder 332 on the latch from the block 334 at the time when the valve-operating lever 250 (Fig. 4) has been moved far enough to be held by the latch 268. It will be understood that the three-armed lever 326 is held against return movement by the latch 268 when the operator releases the treadle.

For imparting upward movement also to the link 52 to move the valve 34 (Fig. 10) into position to cause the development of operating pressure in the manifold 4 by the first depression of the treadle 298, there is freely mounted on the rod 302 a three-armed lever 354 (Fig. 7), a rearwardly extending arm 356 of which is pivotally connected to the lower end of the link. The three-armed lever 354 is operated by the movement of the three-armed lever 326. For this purpose an arm 358 of the lever 326 engages a roll 360 mounted on an arm 362 of the three-armed lever 354. It will thus be seen that by the action of the arm 358 on the roll 360 the lever 354 is operated to move the valve-operating lever 38 to the position in which it is held by the latch 60, and it will be understood that this latch prevents return movement of the three-armed lever 354 when the three-armed lever 326 is returned simultaneously with the opening of the grippers upon release of the lever 250 after the starting of the cycle.

For imparting upward movement to the link 138 to operate the valve 116 (Fig. 11) and thus to start the rotation of the control shaft 2 by the second depression of the treadle there is freely mounted on the rod 302 a two-armed lever 364 (Fig. 8) a rearwardly extending arm 366 of which is pivotally connected to the lower end of the link. The lever 364 is operated by a latch 368 which is pivotally mounted on the rod 318 and is provided with a shoulder 370 arranged to engage a block 372 mounted on the second arm 374 of the lever 364. A torsion spring 376 (Fig. 3) on the rod 318 engages a pin 378 on the latch and thus tends to swing the latch in a downward direction. When the treadle is first operated, however, the latch 368 is held upraised in a position where its shoulder 370 will not act on the block 372 but will be carried idly to a position over the block by the beginning of the movement of the treadle, thus preventing operation of the valve 116. For this purpose a third arm 380 of the three-armed lever 354 has pivotally mounted thereon at 382 a bell-crank lever 384 one arm of which carries a pin 386 engaging the lower face of the latch 368. The other arm of this bell-crank lever is connected by a link 388 to the stationary rod 348. In the operation of the three-armed lever 354, therefore, its arm 380 carries the bell-crank lever 384 in a downward direction and thus causes the pin 386 to release the latch 368 and permit it to be moved downward into engagement with the block 372 by the spring 376. When the latch thus engages the block, however, its shoulder 370 has been carried to a position over the block, so that it will not operate the lever 364. When the operator releases the treadle the latch 368 is carried rearwardly along the block 372 by the rod 318 into position to be swung downwardly by the spring 376 to position its shoulder 370 in operative relation to the block and thus to render it effective to operate the lever 364 and to start the machine in response to the next depression of the treadle. To insure that the valve 116 will not be moved beyond its fully open position by the treadle, an upwardly extending arm 390 of the latch 368 has adjustably mounted thereon a plate 392 arranged to engage the rod 348 and to disengage the latch from the block 372 at the time when the valve-operating lever 132 (Fig. 11) arrives in position to be held by the latch 140. It will be understood that when the treadle is released the lever 364 is held in the position to which it was moved by the treadle by the action of the latch 140 on the valve-operating lever 132.

When the lever 250 is released by the cam means shown in Fig. 4 to cause the grippers to open and release the upper in the manner hereinbefore described, the three-armed lever 326 (Fig. 6) is returned to its initial position in response to the action of the spring plunger 284 on the lever 250, since there is nothing in the construction of the above-described treadle-operated mechanism to prevent such return of the lever 326, the latch 330 having been moved rearwardly by the rod 318 upon release of the treadle. When the lever 250 is thereafter operated in the manner also hereinbefore described to cause the grippers to grip the upper the second time and is later released to cause the grippers to open, the three-armed lever 326 is moved idly by reason of its connection to the lever 250.

Reference has been made to the fact that prior to the end of the cycle of operations the plate 156 (Fig. 11) on the cam 152 operates the latch 140 to release the valve-controlling lever 132 and thus to stop the rotation of the control shaft 2. When the lever 132 is returned at this time by the spring plunger 150 the lever 364 (Fig. 8) also is returned to its initial position by reason of its connection to the lever 132. The valve 116 is thereafter moved into position to start the machine again by a third depression of the treadle, the latch 368 being at this time in position to engage the block 372 and to act on the lever 364, since the three-armed lever 354 (Fig. 7) controlling the pressure in the manifold is still in the position to which it was first moved by the treadle and accordingly the pin 386 is not acting on the latch 368. At the time when the machine thus comes to a stop prior to the end of the cycle the grippers are open and accordingly the three-armed lever 326 (Fig. 6) has been returned to its initial position. In order to prevent the third depression of the treadle from operating this lever to cause the closing of the grippers, the latch 330 is held at this time in such an upraised position (Fig. 9) that its shoulder 332 will not engage and act on the block 334. For this purpose the roll 360 carried by the arm 362 of the three-armed lever 354 is arranged to act on the arm 342 which, as hereinbefore explained, is integral with the latch 330. That is, in response to the first depression of the treadle the roll is carried forwardly to the position shown in Fig. 9, and when the latch 330 is carried rearwardly by the rod 318 upon release of the treadle the roll, remaining in that position, engages the arm 342 and swings the latch upwardly to an idle position, so that it will have no effect on the block 334 and the lever 326 when the treadle is depressed the third time. It will be understood that the three-armed lever 354 one arm of which carries the roll 360 normally remains in the position to which it was moved by the treadle until the end of the cycle.

Figure 14:
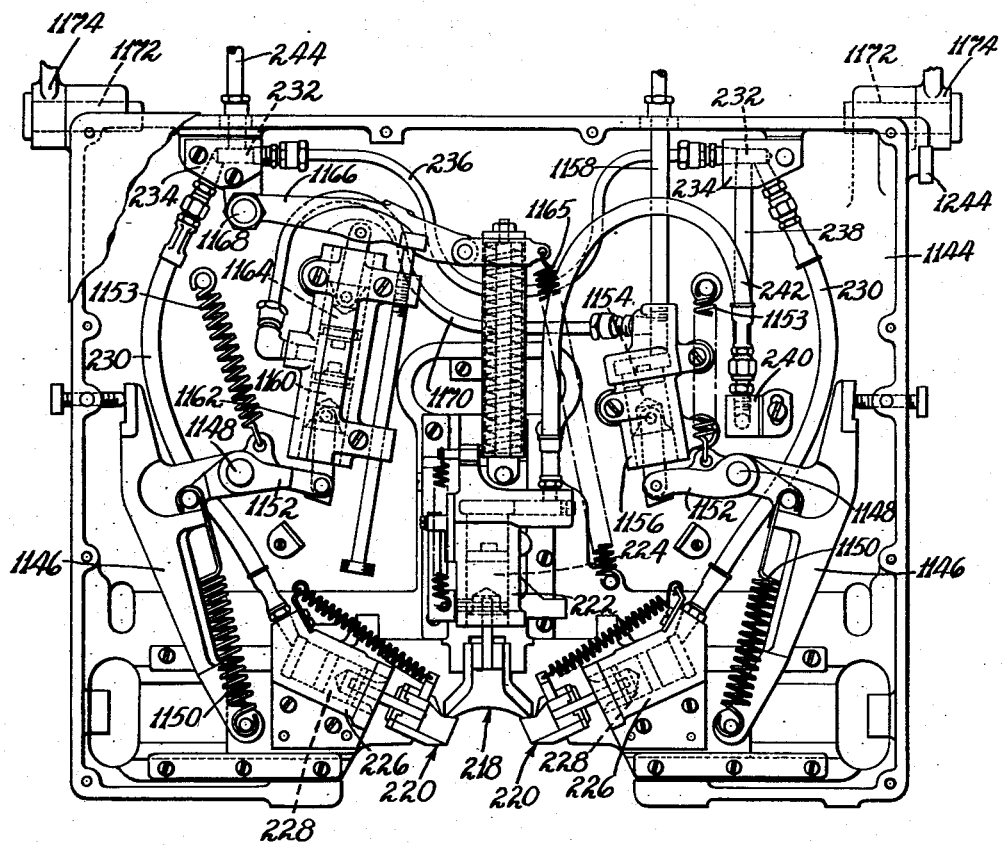
Fig. 14 is a plan view showing the grippers and their operating mechanism.

After the first depression of the treadle 298 to cause the development of operating pressure in the manifold and the closing of the grippers on the upper, the operator may observe the manner in which the upper has been gripped and if conditions are not satisfactory may cause the grippers to open and release the upper and thus permit its margin to be better positioned between the gripper jaws. For this purpose there is mounted on the rod 302 at the left of the treadle 298 a releasing treadle 394 (Fig. 4) movable against the resistance of a return spring 395 from a position determined by its engagement with a boss 396 on the casting 304. The rear end of this treadle is connected by a link 397 to an arm 398 which is fast on a rockshaft 400 mounted in bearings formed in the casting 42 (Fig. 10) which supports the lever 38 for operating the valve 34. Integral with the arm 398 is an upwardly extending arm 402 arranged to engage the front end of the rod 274 which controls the latch 268. In response, therefore, to depression of the treadle 394 the rod 274 is moved rearwardly to cause the latch to release the lever 250, thus causing the valve 248 to return to its initial position and to release the fluid from the gripper-closing cylinders 222 and 226 (Fig. 14). Also fast on the rockshaft 400 is an upwardly extending arm 404 (Fig. 10) arranged to engage the front end of the rod 64 which controls the latch 60 and thus simultaneously to release the valve-controlling lever 38 to cause the valve 34 to return to its initial position and terminate the operating pressure in the manifold. It will be observed by reference to Fig. 6 that if the lever 38 were not thus released, thereby permitting the three-armed lever 354 (Fig. 7) to be returned to its initial position, the operator could not thereafter cause the grippers to grip the upper again by depression of the treadle 298, since the roll 360 carried by the lever 354 would, as hereinbefore explained, prevent the latch 330 from operating the three-armed lever 326 upon depression of the treadle. Accordingly, when the operator again depresses the treadle 298, after properly positioning the margin of the upper relatively to the gripper jaws, the results are the same as when the treadle was first depressed; that is, operating pressure is developed in the manifold and the grippers are closed on the upper.

Provision is further afforded for using the treadle 394, if desired, after the starting of the cycle of operations of the machine to cause return movement of the starting valve 116 (Fig. 11) while also terminating the operating pressure in the manifold as above described and causing the grippers, if they are closed at that time, to release the upper. For this purpose there is loosely mounted on the rockshaft 400 an arm 406 (Fig. 11) arranged to engage the front end of the rod 148 and thereby to move the latch 140 into position to release the lever 132 which controls the valve 116. For thus operating the arm 406 by the treadle 394 the arm 404 (Fig. 10) has integral therewith a downwardly extending arm 408 provided with a lateral extension 410 arranged to engage the rear face of a downwardly extending arm 412 which is integral with the arm 406. The arm 406 is therefore operated by the swinging of the arm 408 to stop instantly the rotation of the control shaft 2. A spring 414 connected to the arm 412 holds it normally against the lateral extension 410 of the arm 408. It will be understood that if the treadle 394 is thus used after the starting of the cycle, two depressions of the treadle 298 will thereafter be required to cause the machine to complete the cycle.

Also integral with the arm 406 is an upwardly extending arm 416 by engagement with which the arm 406 may be swung about the shaft 400 against the resistance of the spring 414 to stop the cycle of operations at any time without terminating the operating pressure in the manifold and without affecting the grippers. For thus operating the arm 416 there is slidingly mounted in the frame of the machine a rod 418 (Fig. 4) having a screw 420 adjustably threaded in its rear end for engaging the arm. Mounted on the front end of the rod 418 is a pad 422 arranged to be engaged by the knee of the operator to move the rod rearwardly against the resistance of a return spring 424. A collar 426 fast on the rod is arranged to engage the frame to limit forward movement of the rod. It will be understood that if the operator thus stops the machine at any time with the pressure still maintained in the manifold he may thereafter start it again by one depression of the treadle 298, since the latch 368 (Fig. 8) will be in position to act on the lever 364.

In order that the cycle of operations will not be started by the first depression of the treadle 298, it is necessary that the lever 364 shall have been fully returned to its normal starting position, since otherwise the latch 368, which is swung downwardly as described at the beginning of the movement of the treadle, might act on the lever 364 by engagement of its shoulder 370 with the block 372. For better insurance that the lever 364 will thus be fully returned the lever 38 which controls the valve 34 has extending laterally therefrom an arm 428 (Figs. 3 and 10) in which is threaded a screw 430 in position to engage a boss 432 (Fig. 11) on the lever 132 connected to the lever 364.

To insure that the control shaft 2 will come to a stop at the end of the cycle precisely in the correct position there is pivotally mounted on an upward extension 434 (Fig. 4) of the casting 80 an arm 436 having thereon a shoulder 438 arranged to engage a block 440 (Fig. 13) which is mounted on a cam 442 on the shaft 2, this being one of the several cams for controlling the various operating mechanisms. The arm 436 is controlled by a link 444 pivotally connected at its lower end to the lever 250 which controls the valve 246. A pin 446 on the arm 436 extends through a slot 448 in the link and is engaged above by a spring-pressed pin 450 mounted in the link, so that the position of the lever 250 will not be affected by engagement of the block 440 with the arm 436. Since the forwardly extending arm 258 of the lever 250 is moved upwardly as described to cause the grippers to close on the upper by the first depression of the treadle 298, the arm 436 is disengaged from the block 440 prior to the starting of the cycle of operations, and since the lever 250 is returned to its initial position prior to the end of the cycle, the arm 436 is thereby returned into position for its shoulder 438 to be engaged by the stop 440 at the end of the cycle.

It is desirable to prevent such depression of the treadle 298 as to operate the valves controlled thereby at any time when the machine is idle and the motor 16 which operates the pump 14 is not running. Pivotally mounted, therefore, on the casting 304 (Fig. 3) is an arm 452 which at all times when the motor 16 is not running is held by a spring 454 in a position in which its front end underlies a projection 456 (Fig. 7) on the U-shaped treadle lever 300 to prevent any effective movement of the treadle. To swing the arm against the resistance of the spring 454 out from under the projection 456 and thus to permit depression of the treadle, there is provided a piston 458 mounted in a cylinder 460 on the casting 304, the piston having a boss 462 thereon in engagement with the arm. Through a pipe 464 the cylinder 460 is in communication with the manifold 4 (see Fig. 1). The spring 454 is of such strength that the arm 452 will be swung from under the projection 456 on the treadle lever 300 by the comparatively light pressure of the fluid in the manifold 4 before the valve 34 has been moved into the position to cause the development of the full operating pressure in the manifold. The movement of the arm by the piston is limited by engagement of the arm with a stop 466 on the casting 304.

The valves for controlling the flow of operating fluid to and from the rest of the fluid-operated mechanisms with which the machine is provided are all like the valve 248 (Fig. 4) and control the fluid in the same manner. One of these valves is shown at 468. Some of them are located in the chamber 126 at the front of the manifold 4 and others in a chamber 470 formed in the casting 6 at the rear of the manifold. It will be understood that the fluid from the mechanisms associated with the valves at the front of the manifold exhausts into the chamber 126 from which it returns to the sump 12 through the ports 128, the chamber 129 and the ports 130, and similarly the fluid from the mechanisms associated with the valves at the rear of the manifold exhausts into the chamber 470 which communicates with the chamber 129 through ports 472. Each of these several valves is operated by a lever like that shown at 474 as associated with the valve 468, the lever 474 being pivotally mounted at 476 on a casting 478 fast on the casting 6. It includes a downwardly extending arm 480 connected to the valve and a substantially horizontal arm 482, a portion only of which is shown in Fig. 4, arranged to be engaged by an appropriate cam on the control shaft 2. A spring plunger 484 engaging the arm 482 holds the valve 468 initially against the casting 6 and returns it to that position when permitted by the cam. Associated with the valve 468 is a ball check valve 486 controlled in the same manner as the previously mentioned check valve 278 for preventing any return flow of fluid into the manifold, a similar check valve being associated with each of the several other valves above referred to. An advantage of this construction is that any momentary reduction in the pressure of the fluid in the manifold, due to the admission of a comparatively large volume of fluid to one or more of the mechanisms, will not cause any retractive movement of a device or mechanism already operated and still controlled by the pressure of the fluid. It will be noted also that if the operating pressure in the manifold is terminated at any time in the cycle by use of the treadle 394 as hereinbefore described, the parts already operated and still controlled by the pressure, with the exception of the piston 86 which operates the control shaft, will remain in the positions to which they have been moved instead of returning to their starting positions. Accordingly the cycle of operations will thereafter be resumed at the point where it was interrupted.

Reference has been made to the fact that between the pipe 244 leading to the gripper-closing cylinders 222 and 226 (Fig. 14) and the pipe 246 to which fluid is delivered by the valve 248 (Fig. 4) for closing the grippers on the upper is pressure-controlling means for controlling the pressure of the fluid in the gripper-closing cylinders and therefore the force with which the grippers grip the upper. This pressure-controlling means is shown in Figs. 34, 35 and 36 and is in some respects an improvement in means shown for the same purpose in Letters Patent No. 2,403,003, granted on July 2, 1946 on an application of mine. The pipe 246 communicates with a port 488 formed in a tubular member 490 which is threaded in the lower end of a cylinder 492 formed in a casting 494 mounted on the frame of the machine. The port 488 leads to a larger passageway 496 in the member 490 in the upper end of which is threaded a nipple 498 provided with a port 500 for the passage of the fluid. Above the nipple 498 the cylinder 492 communicates with the pipe 244 leading to the gripper-closing cylinders through a port 502. Slidingly mounted in the upper end of the cylinder 492 is a piston 504 normally held down by a spring 506, controlled as hereinafter described, in a position determined by engagement of a flange 508 thereon with the casting 494. Threaded in this piston is a stem 510 extending downwardly through the port 500 but of smaller diameter than the port. Below the stem is a ball cut-off valve 512 mounted in a valve cage 514 which is smaller than the diameter of the passageway 496 and is pressed upward to hold the valve normally against the lower end of the stem 510 by a spring 516, the stem extending downwardly far enough to prevent the valve initially from closing the port 500. Accordingly fluid under pressure may pass to the gripper-closing cylinders when the valve 248 is opened. As soon, however, as the pressure of the fluid in the gripper-closing cylinders and in the cylinder 492 becomes great enough to overcome the force of the spring 506 it forces the piston 504 slightly upward, thus permitting the spring 516 correspondingly to raise the valve 512 and to seat it against the lower end of the nipple 498, thereby closing the port 500. Any slight drop thereafter in the pressure of the fluid in one or more of the gripper-closing cylinders, such as may result, for example, from the slipping of the gripper jaws from one portion of the upper to a thinner portion thereof, will cause the piston 504 to be moved downward by the spring 506 to open the valve 512, whereupon the pressure in the gripper-closing cylinders will be immediately restored to its normal value and the valve will be closed again.

To vary the force with which the grippers grip the upper, manually operated means is provided for varying the compression of the spring 506. The upper end of the spring is seated against a hollow plunger 518 mounted in a bore formed in a casting 520 fast on the casting 494. Pivotally mounted at 522 on the plunger 518 is a lever 524 one end of which is pivotally connected to a link 526 supported as hereinafter described. The other end portion of the lever 524 is connected by a link 528 to a hand lever 530 pivotally mounted at 532 on a member 534 fast on the front of the frame. The hand lever is provided with a spring-pressed pin 536 arranged to enter any one of a plurality of holes 538 in the member 534 to retain it in adjusted position. In adjusting the compression of the spring 506 by the movement of the hand lever the lever 524 fulcrums on the link 526. To make it easier for the operator to effect this adjustment, the force of the spring 506 is partially counterbalanced by another spring 540 connected to the lever 524.

As explained in Letters Patent No. 2,403,003, it is desirable that in pulling the upper the second time, after the trimming of the margins of the inner layers of the upper materials, the grippers shall grip the outer layer with less force than in pulling the upper the first time prior to the trimming operation, so that they will more readily slip on the outer layer and apply a less forcible pull thereto the second time. To accomplish this, the above-mentioned link 526 is pivotally mounted on the upper end of a rod 542 the lower end of which is secured to a piston 544 movable in a cylinder 546 formed in the casting 494. A spring 548 mounted in the cylinder and in the casting 520 holds the piston normally at the limit of its downward movement determined by its engagement with the casting 494 at the lower end of the cylinder. At a predetermined time in the cycle fluid under pressure is admitted to the lower end of the cylinder through a pipe 550 which conveniently leads from a fluid line whereby fluid is supplied at this time to one of the operating mechanisms. The piston 544 is thus moved upward a short distance to decrease the compression of the spring 506, the lever 524 swinging on the link 528 as a fulcrum. This upward movement of the piston is adjustably limited by engagement of a pin 552 (Fig. 35) in the upper end of the rod 542 with a stop member 554 vertically movable in guideways on the side of the casting 520, the pin 552 connecting the link 526 to the rod 542. Pivotally mounted at 556 on the casting is a hand lever 558 having a pin-and-slot connection with the lower end of the stop member 554 for adjusting it. The hand lever carries a spring-pressed pin 560 arranged to enter any one of a series of holes 562 in a member 564 on the frame to retain it in adjusted position. It will be understood that the spring 548 is stronger than the spring 506 to permit the latter to be adjusted as described by the hand lever 530 while the rod 542 is stationary.

For positioning the shoe heightwise in the machine there is provided a sole rest 566 (Figs. 1 and 37) arranged to engage the bottom of the forepart of the insole when the operator presents the shoe to the machine. For supporting the shoe in the position thus determined the machine is provided with a toe rest 568 which is moved upwardly and clamps the shoe against the sole rest. In the machines shown in Letters Patent No. 2,324,509 and No. 2,377,887 the corresponding toe rest was moved upwardly and forced against the shoe after the beginning of the cycle of operations of the machine, and accordingly the operator was required to support the shoe in his hands until after the second depression of the treadle to start the cycle of operations. To afford greater insurance that one of the operator's hands will not be injured by being caught between the toe rest and the shoe, the construction herein shown in such that the toe rest 568 is moved upwardly to clamp and hold the shoe with only comparatively light pressure prior to the starting of the cycle, this operation taking place in response to the first depression of the treadle to cause the development of pressure in the manifold and the closing of the grippers as hereinbefore described. After the starting of the cycle greater force is applied to the toe rest to cause it to support the shoe as firmly as required in the course of the lasting operation. For the purposes in view the toe rest 568, which is constructed as more particularly hereinafter described, is mounted on the upper end of a support 570 (Fig. 27) provided with a downwardly extending cylindrical stem 572 slidingly mounted in a bore formed in a piston 574 which is itself vertically movable in a cylinder 576 formed in a casting 578 supported on an intermediate portion 580 of the frame. The support 570 rests initially on the top of an upraised portion 582 of the piston 574. Secured to the support is a bar 584 which extends forwardly through a hole formed in the head of another piston 586 of comparatively small diameter mounted in a cylinder 588 formed in the casting 578. The lower end of the cylinder 588 is in communication, through a port 590 in the casting 578, with a pipe 592 which is in communication with the fluid line leading from the manifold to the gripper-closing cylinders at a point in that line between the valve 248 (Fig. 4) and the pressure-controlling means shown in Fig. 34. It will therefore be understood that when fluid under pressure is admitted to this fluid line in response to the first depression of the treadle, as hereinbefore described, the toe rest is moved into position to clamp and hold the shoe, the pressure thus applied to the shoe, however, being comparatively light because of the small diameter of the piston 586 to avoid any possible danger of injury to the operator. In this operation, which is effected against the resistance of a return spring 594 connected to the bar 584, the stem 572 extending downwardly from the support 570 slides upwardly in the bore in the piston 574. It will be understood that if the operator thereafter causes the grippers to open and release the upper in the manner described prior to the starting of the cycle of operations, the fluid is released from the cylinder 588 and the toe rest is moved downwardly away from the shoe by the spring 594.

The purpose of the larger piston 574 is to press the toe rest more forcibly against the shoe after the starting of the cycle of operations. This piston carries a pin 596 which extends through slots 598 in the opposite sides of the cylinder 576, the downward movement of the piston being limited by engagement of this pin with the cylinder at the lower ends of the slots. A spring 600 connected to this pin holds the piston initially at the limit of its downward movement. The pin extends also through a slot 602 in the stem 572 to permit the required upward movement of the support 570 while the piston 574 is stationary and to permit this piston thereafter to move upward relatively to the stem. Fluid under pressure is delivered at the proper time into the lower end of the cylinder 576 through a pipe 604 to which fluid is admitted from the manifold 4 by a valve controlled by the appropriate cam on the shaft 2.

The toe rest 568 in the form shown in Figs. 27, 28 and 29 comprises a block 606 having an upper face which is curved about an axis extending widthwise of the shoe and on which is secured by screws 608 a facing of leather or other suitable material 610 for engaging the upper of the shoe. The block 606 extends downwardly into a slot extending widthwise of the shoe in a holder 612, the lower face of the block being curved about an axis extending lengthwise of the shoe and engaging a complementally curved face 614 on the holder. Mounted in the block is a pin 616 which is pressed outwardly by a spring 618 in the block and has a rounded end arranged to engage an inclined face 620 on the holder 612 to cause the pin to be forced inwardly against the resistance of the spring when the block is inserted in the holder. The pin thereafter snaps into a slot 622 in the holder to retain the block in assembled relation to the holder. The block, however, may be removed from the holder by moving it upwardly, since the pin will be forced inwardly by engagement of the holder with its rounded end. It will be understood that as thus mounted the block 606 may turn about an axis extending lengthwise of the shoe by reason of the engagement of its lower curved face with the face 614 on the holder to permit it to adjust itself in that manner to the shoe, sufficient clearance being provided between the pin 616 and the walls of the slot 622 to permit such movement of the block. Formed in the holder is a recess to receive a somewhat inclined upper end portion 624 of the support 570, and extending into a groove in one side of this portion of the support is a tongue 626 on the holder. A similar tongue 628 formed on a block 630 secured to the holder extends into a similar groove in the opposite side of the portion 624 of the support. It will thus be seen that the toe rest may be adjusted relatively to the support 570 in directions lengthwise of the shoe. For effecting this adjustment the holder 612 is connected by a link 632 to the upper end of a lever 634 pivotally mounted at 636 on the support 570, the lower end of the lever being adjacent to a plate 638 which is fast on the support 570 and has a series of index marks (not shown) thereon to indicate the adjusted position of the toe rest. The friction between the parts is sufficient to hold the toe rest in any position to which it is thus adjusted.

In Figs. 30 and 31 is shown an alternative form of toe rest which is like the construction above described except that in place of the block 606 there is provided a block 640 having an upper plane face 642 on which is mounted another block 644 to which the facing 610 is secured, in this instance, by wires 646 the ends of which are twisted together. Secured in the block 644 is a stud 648 which extends downwardly into a bore in the block 640 to permit the block 644 to turn about an axis extending heightwise of the shoe relatively to the block 640 and thus to adjust itself in this manner to the shoe. The stud 648 has therein an annular groove 650 in which lies a pin 652 in the block 640 to hold the two blocks in assembled relation. A spring 654 in the block 640 frictionally engages the lower face of the block 644 to prevent the latter from turning too freely. Its turning movement is limited by a pin 656 extending downwardly therefrom into a recess 658 in the block 640.

Figure 37:
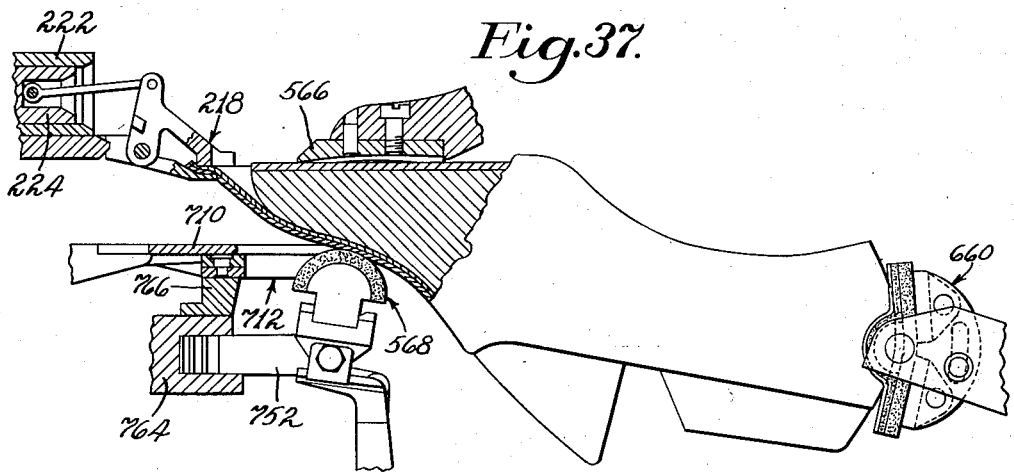
Fig. 37 is a view partly in left-hand side elevation and partly in section, showing the shoe and parts adjacent thereto as they appear immediately after the first depression of the treadle.

Similarly to the disclosure of Letters Patent No. 2,324,509 the machine is further provided with a heel rest 660 supported on a carrier 662 (Figs. 2 and 27) which is fast on a shaft 664 mounted, in this instance, to turn in bearings formed in the previously mentioned casting 578. By the movement of the carrier, therefore, the heel rest is swung from an initial position upwardly and rearwardly into engagement with the heel end of the shoe to assist in holding it against lengthwise displacement. To avoid any danger of injury to the operator, the heel rest, as well as the toe rest, in the machine herein shown, is moved into engagement with the shoe with comparatively light pressure prior to the starting of the cycle of operations, as shown in Fig. 37, and is forced more firmly against the shoe after the starting of the cycle. For this purpose the carrier 662 is connected by a pair of links 666 to a cross rod 668 (see Fig. 20) extending through a cylindrical block 670 which is mounted to move in the manner of a piston in a cylinder 672 formed in a casting 674 supporting on the portion 580 of the frame. Formed in opposite sides of the cylinder 672 are slots 676 along which the rod 668 is movable. For operating the block 670 to apply the heel rest there is provided a piston 678 (Fig. 20) of comparatively small diameter movable in a cylinder 680 which is formed in a casting 682 mounted alongside of the casting 674. Pivotally mounted on a pin 684 in an extension 686 (Fig. 27) of the casting 682 is a downwardly extending arm 688 arranged to engage the rod 668, and mounted on this arm is a pin 690 arranged to be engaged by a head 692 on the piston 678. When fluid is admitted, therefore, to the cylinder 680 the piston 678 swings the arm 688 about the pin 684 and by engagement of this arm with the rod 668 swings the carrier 662 to apply the heel rest to the shoe with comparatively light pressure. Fluid is thus admitted to the cylinder 680 through a pipe 694 which, like the pipe 592 through which fluid is delivered to operate the toe rest, leads from the fluid line whereby fluid is admitted to the gripper-closing cylinders in response to the first depression of the treadle. Secured to the head 692 of the piston 678 is a rod 696 slidingly movable in a lug 698 on the casting 682, and between this lug and a nut 700 on the rod is a spring 702 for returning the piston 678 when permitted.

To force the heel rest more firmly against the shoe after the beginning of the cycle of operations there is freely movable in the cylinder 672 beyond the block 670 a piston 704 arranged to act through the block to apply the increased force to the heel rest in response to the admission of fluid under pressure to the cylinder 672. That is, the block 670 is moved away from the piston 704 by the action of the small piston 678 thereon, and later the piston 704 is moved into engagement with the block and applies the greater force to the block, this piston being of substantially greater diameter than the piston 678. Fluid is thus admitted to the cylinder 672 through a port 706 from a pipe leading from one of the previously mentioned cam-controlled valves adjacent to the manifold. When the fluid is released from the cylinder 672 the piston 704 is returned by the block 670 which is itself returned by the weight of the heel rest and of portions of the carrier 662. To facilitate the starting of the movement of the block 670 by the piston 678 a vent hole 708 extends through the block from one end to the other.

In general accordance with the disclosure of Letters Patent No. 2,324,509, the machine is provided with a pair of toe-embracing wipers 710 (Fig. 15) for wiping the margin of the upper inwardly over the insole and with a toe former 712 (Fig. 16) for wiping the toe end of the upper heightwise of the last as the wipers and the toe former are moved upwardly as a unit prior to the wiping of the margin of the upper inwardly. In further accordance with the disclosure of Letters Patent No. 2,377,887, the wipers and the toe former are thus moved upwardly to cause the toe former to wipe the upper heightwise of the last twice in the cycle of operations, first preparatory to the previously mentioned upper-trimming operation (Fig. 38) and again after that operation (Fig. 41) coordinately with the second pull applied to the upper by the grippers, preparatory to the wiping of the margin of the upper inwardly over the insole. The mechanism for operating and controlling the wipers will be herein only briefly described, since it is for the most part of the same construction as disclosed in Letters Patent No. 2,324,509 as modified by the disclosure of Letters Patent No. 2,479,574, granted on August 23, 1949, on an application of mine. The wipers are detachably secured to wiper holders 714 which are slidingly mounted for swinging movements on a wiper carrier 716 to close the wipers inwardly over the shoe bottom as the wiper carrier is operated to advance them lengthwise of the shoe. Such operative movement is imparted to the wiper carrier by a fluid-operated piston 718 movable in a cylinder 720 and connected to the carrier by a piston rod 722. The wiper-closing movements are imparted to the wiper holders 714 in response to the movement of the wiper carrier by means which need not be herein described. The wiper carrier 716 is supported on a casting 724 which may be termed a wiper support and to which the cylinder 720 is secured, and this casting is supported on upper and lower pairs of parallel links 726 and 728 (see Fig. 2) for upward and downward movements, the upward movement being imparted thereto by means hereinafter described. The piston 718 is moved to operate the wipers by fluid admitted to the rear end of the cylinder 720 through a conduit 730 leading from one of the cam-controlled valves adjacent to the manifold, and the wipers are retracted by fluid admitted to the front end of the cylinder from a conduit 732 leading from another of these valves. In order to avoid any objectionable interference of the wipers with the toe ends of shoes of some styles as the wipers and the toe former are moved upwardly, the wiper carrier 716 is held in what may be termed an abnormally retracted position lengthwise of the shoe until near the end of its upward movement by a spring-controlled rod 734 (Fig. 2) the upper end of which enters a recess in the carrier to serve as a latch, this rod corresponding to the rod 86 shown in Letters Patent No. 2,479,574 and being mounted to move upwardly with the wiper support 724. When the wiper support has nearly arrived at the limit of its upward movement a nut 736 on the lower end of the rod 734 engages a bracket 737 fast on the casting 578 (Fig. 27) to stop the movement of the rod and thus to cause the release of the wiper carrier. In the construction herein shown the carrier, when thus released, is moved a short distance forwardly to carry the wipers into what may be termed a normal relation to the shoe by a plurality of springs 738 which are mounted in the piston 718 and engage the heads of studs 740 movable in a member 742 fast on the piston, the rear ends of the studs being arranged to engage the rear wall of the cylinder 720. The amount of movement thus imparted to the wiper carrier by the springs is determined by engagement of the heads of the studs with the member 742. It will be understood that the springs are compressed in response to engagement of the studs with the wall of the cylinder near the end of the rearward movement of the piston 718.

As distinguished from the one-piece flexible toe former shown in Letters Patent No. 2,479,574, the toe former 712 comprises a pair of upwiping and clamping members 744 which are formed of rigid material, preferably metal, and are curved lengthwise of the edge of the shoe bottom to conform substantially to the contours of the toe ends of shoes of the style on which the machine is to operate. The two members are pivotally connected together by a stud 746, as shown in Fig. 19, and one of them is provided with a small pin 748 extending into a slot 750 in the other member to limit relative swinging movements of the members. The two members 744 are supported substantially midway between their opposite ends on forwardly extending arms of two bell-crank levers 752 provided with pins 754 extending upwardly into holes in the members. As illustrated in Fig. 18, these pins are downwardly movable in the bell-crank levers against the resistance of springs 756 by means of fingers 758 extending from the pins through slots 750 in the levers to permit the members 744 to be removed when it is desired to substitute different members. The bell-crank levers 752 are pivotally mounted, similarly to the levers 122 shown in Letters Patent No. 2,479,574, on studs 762 which are fast on a casting 764 movably supported on portions of the wiper holders 714 in the same manner as the corresponding casting 118 shown in the last-mentioned Letters Patent. The rear end portions of the members 744 in the vicinity of the stud 746 are supported on a block 766 fast on the casting 764 over the levers 752. These bell-crank levers have arms extending inwardly toward each other and provided with intermeshing teeth 768 which connect the levers together for equal swinging movements about the studs 762. In the construction herein shown the bell-crank levers 752 are yieldingly controlled and are adjustable to vary the relative positions of the members 744 by means including a rod 770 which is threaded in a projection 772 formed on the casting 764 and has thereon two springs 774 and 776. These two springs abut respectively against collars 778 and 780 fast on the rod and also bear respectively against washers 782 and 784 between the upper portions of which is a pin 786 extending downwardly from a portion of one of the bell-crank levers 752. It will thus be seen that by turning the rod 770 the members 744 may be swung toward or from each other about the stud 746 to position them preliminarily as may be desired, and that if they are initially nearer together than the width of the toe, they will be forced apart by the shoe against the resistance of the spring 776. If, on the other hand, the members are initially farther apart than the width of the toe, they will be swung inwardly toward each other against the resistance of the spring 774 by the pressure of the toe-end face of the shoe against them. One pair of members will thus satisfactorily adjust themselves to shoes of various sizes, although it is preferable to provide one pair for comparatively wide toes and another pair for comparatively narrow toes. Like the casting 120 shown in Letters Patent No. 2,479,574, the casting 764 is yieldingly controlled by a resilient rod 788 extending into the piston rod 722 in the same manner as the rod 128 shown in said Letters Patent and by yieldable connections between this rod and the casting in further accordance with the disclosure of said Letters Patent to permit the toe former 712 further to adjust itself bodily and angularly to the toe end of the shoe.

In general accordance also with the disclosure of the last-mentioned Letters Patent, the casting 764 supporting the toe former 712 is connected by means including two rearwardly extending links 790 and 792 (Fig. 15) to the forked lower ends of arms 794 and 796 the upper ends of which are integral with a member 798 mounted, in this instance, to turn about two short rods 800 which are fast in the upwardly and downwardly movable wiper support 724. Connected to the forked lower end of a third arm 802 integral with the member 798 is a spring 804 by which the toe former is forced yieldingly against the shoe lengthwise thereof as it wipes the upper heightwise of the last. To limit the movement of the toe former by the spring when there is no shoe in the machine an arm 806 (Fig. 17) extends rearwardly from the member 798 and is arranged to engage an abutment face 808 on the wiper support 724.

Figure 38:
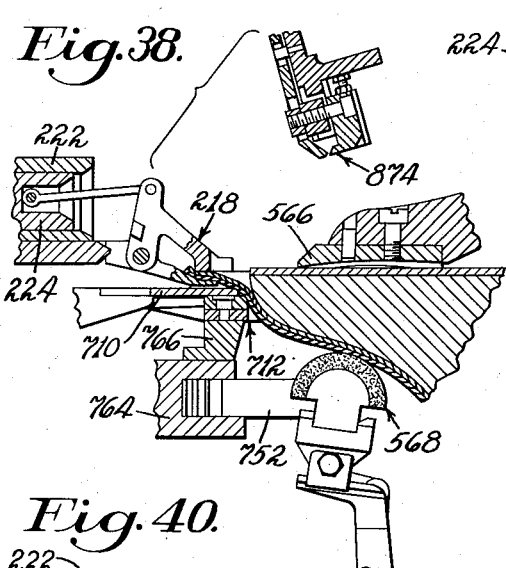
Figure 39:
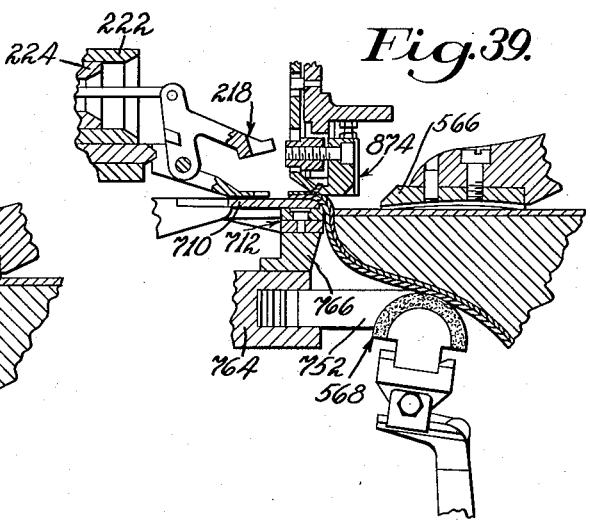

In order to prevent the toe former 712 from engaging the shoe initially too far under the toe in operating on shoes of some styles, the machine is provided with mechanism which differs somewhat in construction from that shown in Letters Patent No. 2,479,574 for retracting the toe former lengthwise of the shoe and for holding it in a retracted position until a variably predetermined time in its upward movement and for then releasing it to cause it to be forced against the shoe by the spring 804. This mechanism includes a piston 810 (Fig. 17) mounted in a cylinder 812 which is secured to the wiper support 724, the piston being movable upwardly against the resistance of a spring 814 and having thereon an upwardly extending rod 816 arranged to engage a plate 818 fast on the arm 806. The lower end of the cylinder 812 is in constant communication through a conduit 820 with the front end of the cylinder 720, and accordingly when the wiper carrier 716 is retracted to the position in which it is held by the previously mentioned latch rod 734 the piston 810 also is moved upwardly and retracts the toe former to a position in which it is held by a latch 822 pivotally mounted on the cylinder 812 and controlled by a spring 824. This latch is part of a bell-crank lever 826 which includes a rearwardly extending arm 828. At the required time in the upward movement of the wiper support 724 the arm 828, which moves upwardly with the support, is engaged by a member 830 to disengage the latch 822 from the plate 818 and thus to release the toe former to permit it to be forced against the shoe by the spring 804, as illustrated in Fig. 38. The member 830 is mounted to turn about a stud 832 on the frame to different positions of adjustment and is provided with a plurality of step faces 834 at different distances from the stud for engagement with the arm 828 to effect the release of the toe former at a time determined by the adjustment of the member. For effecting the adjustment a pin 836 (Fig. 15) extending from a portion of the member 830 is pivotally connected to the rear end of a rod 838 extending forwardly through an opening in the front of the frame and having on its front end a knob 840 for moving it forwardly or rearwardly. To retain the member 830 in adjusted position a spring-pressed detent 841 is arranged to enter one or another of a plurality of recesses 842 in the rod 838. After the upward movement of the toe former it is forced more firmly against the shoe by a fluid-operated piston 843 to which is pivotally connected a rod 844 also pivotally connected to the lower end of the arm 802.

Figure 32:
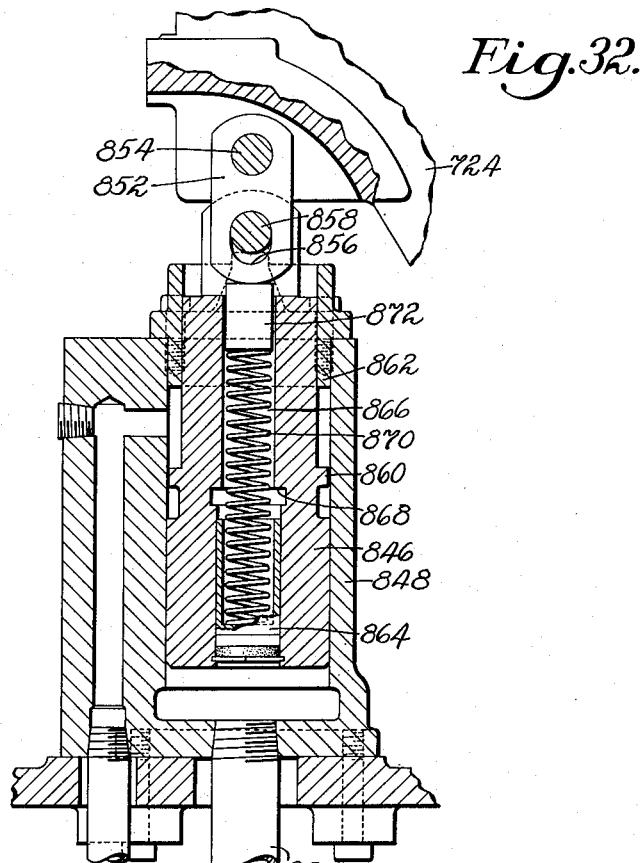
Fig. 32 is a view in vertical section of a portion of the means for imparting upward movement to the wiper support.

The means for imparting the upward movement to the wiper support 724 to raise the wipers and the toe former is, for the most part, of the same construction as disclosed in Letters Patent No. 2,479,575, granted on August 23, 1949 on an application of mine, and such parts as are common to that prior disclosure will be only briefly described. To raise the wiper support there are provided two similar mechanisms, one of which is shown in detail in Fig. 32, each mechanism including a piston 846 vertically movable in a cylinder 848 which is mounted on the frame and into the lower end of which fluid is admitted from a conduit 850 common to the two cylinders and leading from one of the previously mentioned valves adjacent to the manifold. The two pistons are connected respectively to the opposite side portions of the wiper support by links 852 pivotally mounted on pins 854 in the support and provided at their lower ends with slots 856 through which extend pins 858 mounted in upward extensions of the pistons. During the upward movements of the pistons the pins 858 engage the links at the upper ends of the slots 856 to raise the wiper support, the limit of this upward movement of the wiper support being determined by engagement of flanges 860 on reduced portions of the pistons with the lower ends of sleeves 862 extending downwardly into the upper ends of the cylinders. When the wipers are operated to wipe the margin of the upper inwardly over the insole, the slots 856 permit the wiper support and the parts thereon to be moved farther upwardly against the force of gravity in response to pressure of the margin of the upper on the wipers, so that the wipers will not act too severely on the upper in wiping it inwardly if the bottom of the toe end of the last has a substantial convex curvature. For better insurance against such action of the wipers on the upper, the earlier construction shown in Letters Patent No. 2,479,575 included small pistons mounted in the larger pistons with their upper ends in engagement with the lower ends of the links, so that the weight of the wiper support and of the parts thereon would be partially counterbalanced by the pressure of the fluid in the lower ends of the cylinders. In place of those counterbalancing pistons, the construction herein shown provides hollow pistons 864 of small diameters mounted only in the lower end portions of bores 866 extending vertically through the pistons 846 and limited as to upward movements by engagement with shoulders 868 on the larger pistons. Seated in the pistons 864 are springs 870 which extend upwardly in the bores 866 and bear at their upper ends on blocks 872 which are loosely mounted in the bores and engage the lower ends of the links 852. The pressure of the fluid in the cylinders 848 is therefore transmitted to the links 852 through the pistons 864, the springs 870 and the blocks 872, and the springs 870 are of such strength that in view of the limited movements of the pistons 864 the force applied to the links 852 is never great enough actually to raise the wiper support. Insurance is thus afforded that regardless of any abnormally high pressure which may momentarily be developed in the manifold, the wiper support will not be raised beyond the position determined by engagement of the flanges 860 on the pistons 846 with the sleeves 862. It will be evident that if the wiper support were to be raised by pressure of the fluid beyond this normal position, its return, when the pressure became normal, would be prevented by that one of the previously mentioned check valves 486 (Fig. 4) which is associated with the conduit 850 and prevents return flow of fluid from this conduit to the manifold.

Figure 24:
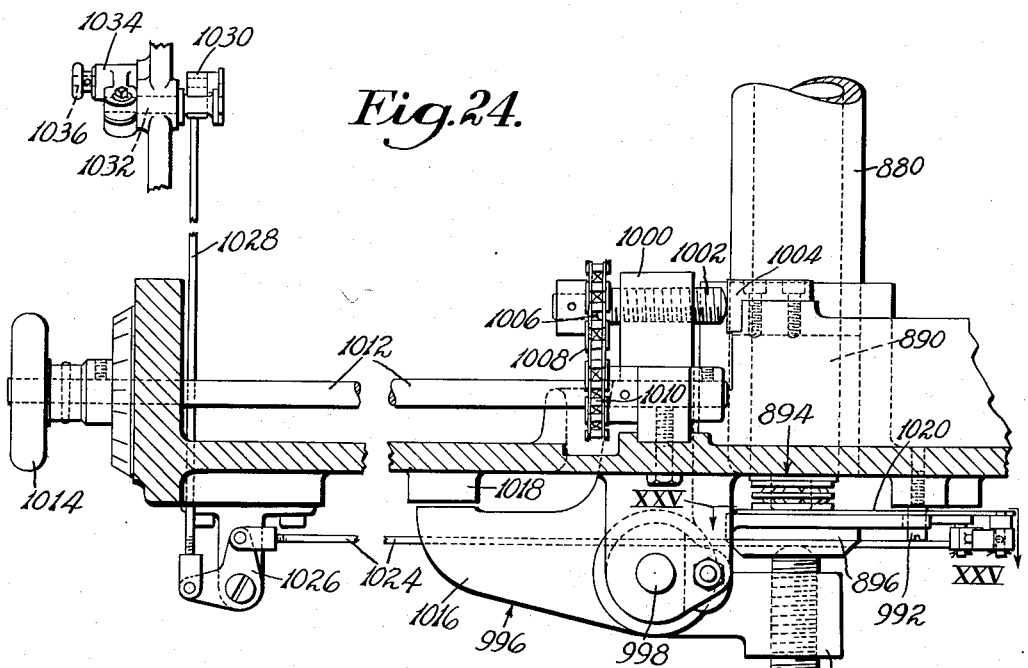
Fig. 24 is a view partly in right-hand side elevation and partly in section of a portion of the structure shown in Fig. 20, with parts omitted.

In general accordance with the disclosure of Letters Patent No. 2,324,509, as modified by that of Letters Patent No. 2,377,887, the machine is further provided with upper-trimming means 874 (Fig. 2) which acts when the wipers are at the limit of their first upward movement to remove from the outspread margin of the upper the margins of all but the outer layer of the upper materials (Fig. 39), and with cement-applying means 876 for later depositing cement on the toe end of the insole (Fig. 41) immediately prior to the inward wiping movements of the wipers for securing the margin of the outer layer of the upper to the insole. The upper-trimming means and the cement-applying means are both supported on a carrier 878 which is secured on a vertical hollow post 880 (Fig. 2). This post is guided at its upper end for vertical movements and for turning movements in a cylinder 882 (Fig. 26) fast in the frame and at its lower end for similar movements in a bushing 884 (Fig. 21) in the frame. By the first downward movement of the post the upper-trimming means is moved into position to operate on the upper, after which the post is moved upwardly and is turned to swing the carrier 878 toward the left and thus to bring the cement-applying means to a position over the shoe. The post is then moved downwardly again to cause the cement-applying means to deposit cement on the shoe, and later in the cycle it is again moved upwardly and is turned to carry the upper-trimming means and the cement-applying means to their initial positions. Each downward movement of the post is effected against the resistance of a spring 886 which is mounted therein between a plug 888 (Fig. 26) threaded in its upper end and a sleeve 890 in its lower end. Fast in the sleeve 890 is a tubular member 892 which extends part way upwardly through the spring to assist in controlling the spring. Both the sleeve 890 and the member 892 rest at their lower ends on a ball bearing 894 (Fig. 24) which is supported on a stop member 896 controlled as hereinafter described and serving by engagement with the lower end of the post 880 to limit its downward movement. The post is vertically movable relatively to the sleeve 890, but when it is turned the sleeve and the member 892, together with the spring 886, may turn therewith. The plug 888 closes the upper end of the post, and accordingly this end of the post acts as a piston in the cylinder 882, downward movement being imparted thereto by fluid admitted at the proper times to the upper end of the cylinder from a pipe 898 leading from one of the previously mentioned valves adjacent to the manifold. The turning of the post to carry the cement-applying means to a position over the shoe is effected by a piston 900 (Fig. 20) movable in a cylinder 902 fast on the frame, the piston being connected by a link 904 to a pin 906 mounted in an arm 908 through one end of which the post extends. A key 910 in the arm extends into a keyway in the post, so that the post will be turned by the arm but may move relatively to the arm in vertical directions. The arm is supported on a portion of the frame (Fig. 21) and is held against upward movement by a bracket 912 fast on the frame. Fluid is admitted to the cylinder 902 through a pipe 914 which leads from one of the previously mentioned valves adjacent to the manifold. The link 904 extends beyond the pin 906 and has fast on its extended portion a finger 916 to which is connected a spring 918 for turning the post reversely to swing the carrier 878 to its initial position when fluid is released from the cylinder 902.

Figure 12:
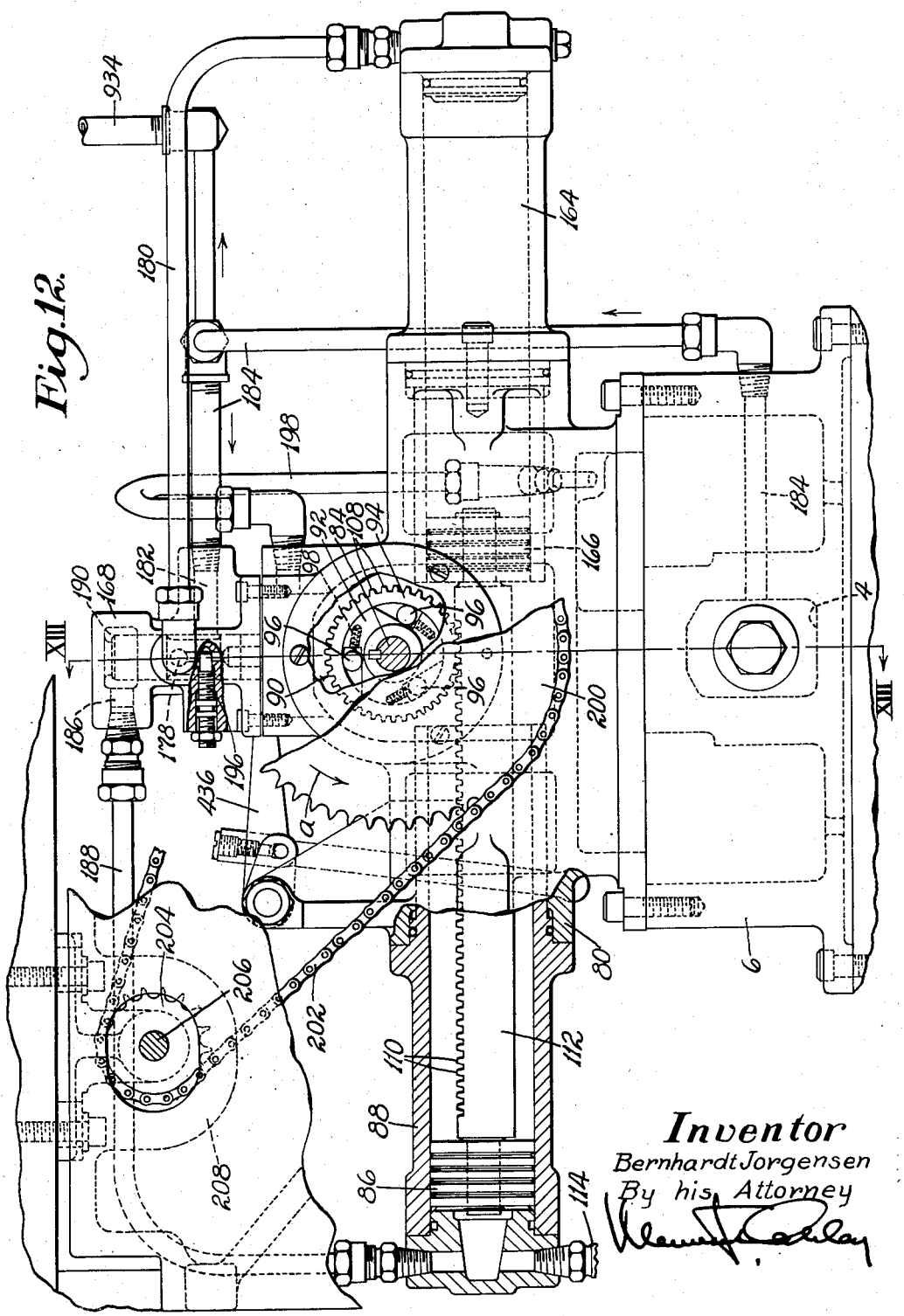
Fig. 12 is a view in right-hand side elevation of a portion of the structure shown at the right-hand side of Fig. 3, with parts broken away.
Figure 13:
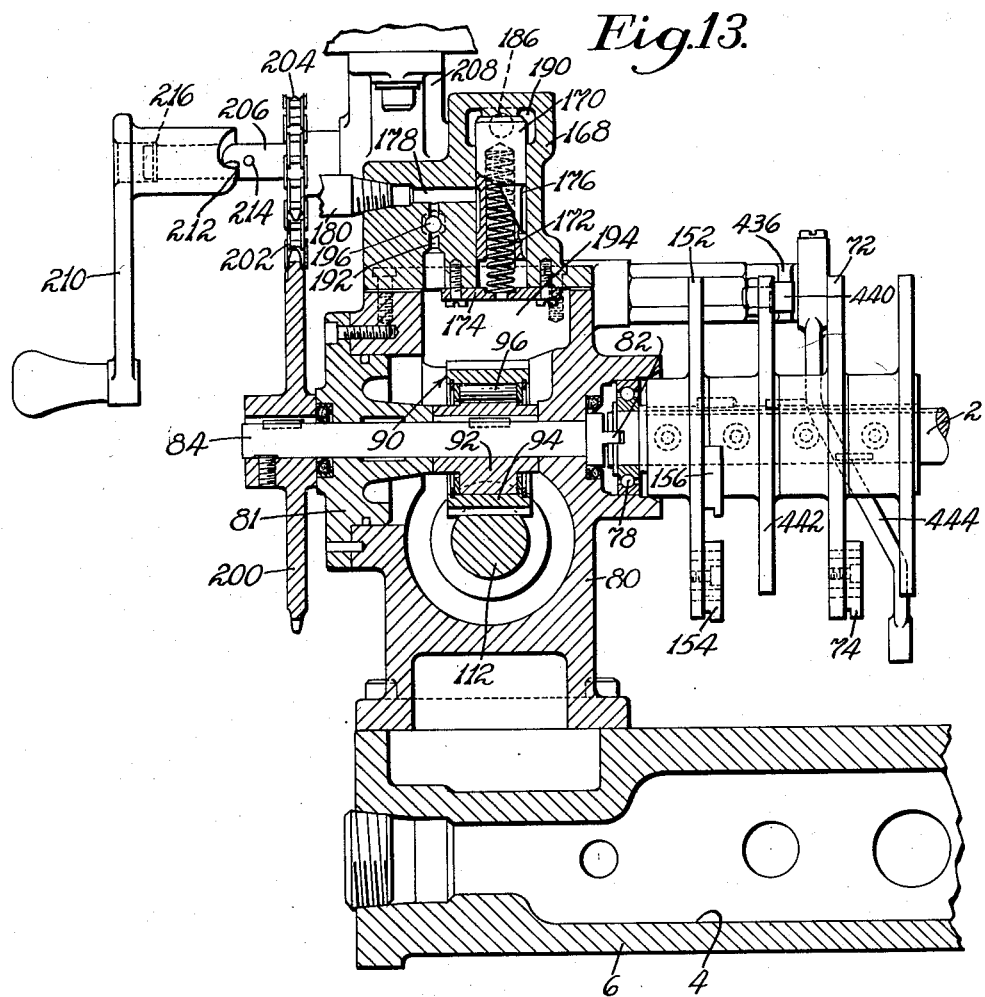
Fig. 13 is mainly a section on the line XIII—XIII of Fig. 12.
Figure 23:
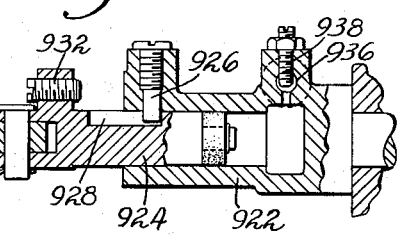
Fig. 23 is a section on the line XXIII—XXIII of Fig. 20.

To limit the swinging movement imparted to the carrier 878 by the piston 900, and at the same time to prevent any substantial shock of impact in thus stopping the movement of the carrier, there is secured to the frame by a screw 920 (Fig. 20) a cylinder 922 in which is mounted a piston 924 (see Fig. 23). A stud 926 in the cylinder extends into a slot 928 in the piston to limit movement of the piston by fluid in the cylinder. Mounted on the outer end of the piston is a roll 930 in position to be engaged by the end of the link 904 as the carrier 878 nears the end of its swinging movement, and also carried by the piston is a screw 932 arranged to engage the end of the cylinder 922 to limit the movement of the carrier. The cylinder 922 is in communication at all times with the manifold 4 through a pipe 934 and the previously mentioned pipe 184 (Fig. 12). The piston 924, however, is of smaller diameter than the piston 900, so that it will only retard the latter portion of the swinging movement of the carrier. To permit the speed of the movement of the piston 924 under the force applied thereto by the link 904 to be varied, a port 936 in the cylinder 922 which leads from the pipe 934 to the interior of the cylinder is adjustably restricted by a needle valve 938 threaded in the cylinder. It will be evident that since the limiting means acts directly on the parts which turn the post 880, it has no tendency to increase the friction between the post and the key 910 when the post is moved downwardly.

Figure 21:
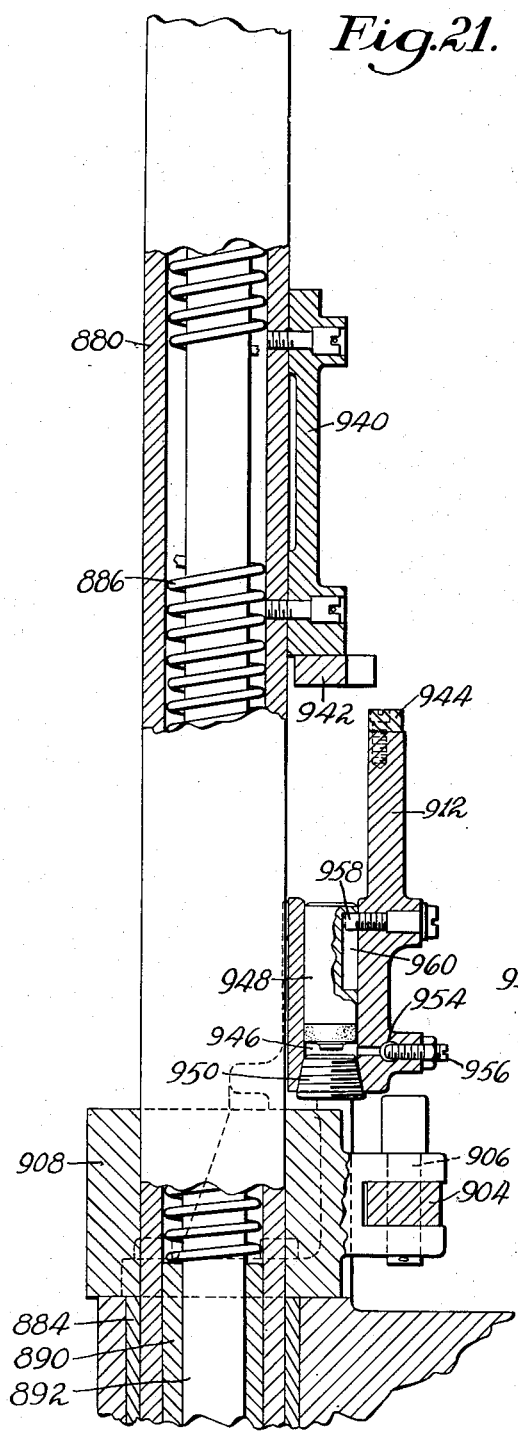
Fig. 21 is a section on the line XXI—XXI of Fig. 20.
Figure 22:
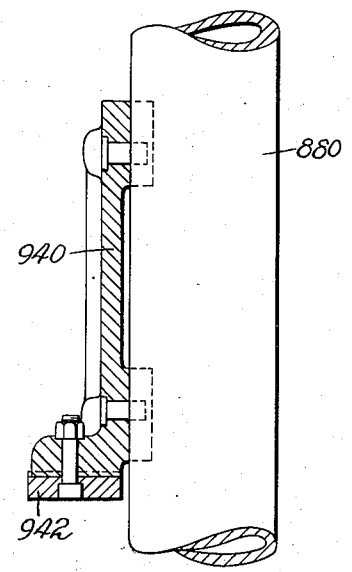
Fig. 22 is a section on the line XXII—XXII of Fig. 20.
Figure 26:
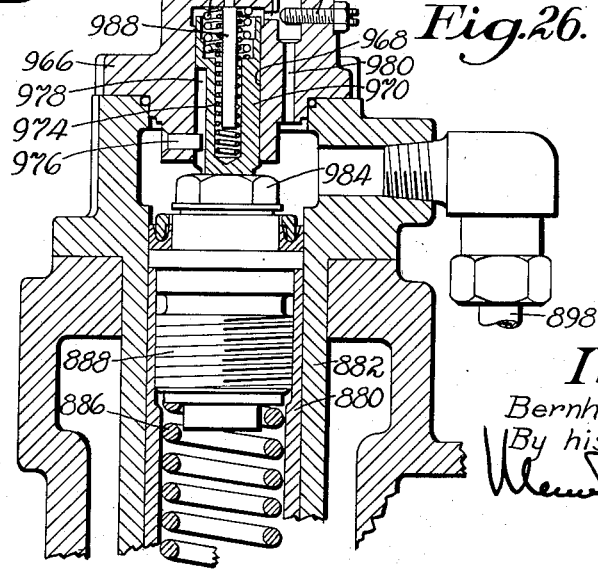
Fig. 26 is a view in vertical section of a portion of the structure near the top of Fig. 2.

In order to avoid possible danger of damage to the machine, a member 940 (Figs. 20, 21 and 22) is secured to the post 880 and is provided on its lower end with a block 942 arranged to engage a block 944 fast on an upwardly extending portion of the bracket 912 to prevent any substantial downward movement of the post if the carrier 878 has not been swung fully to the required position when the fluid is forced into the upper end of the cylinder 882 (Fig. 26). Further to avoid any objectionable shock of impact of the lower end of the post against the stop 896 (Fig. 24), the bracket 912 is formed to provide a cylinder 946 in which is a piston 948 arranged to be engaged and forced downwardly by the block 942 near the end of the downward movement of the post. The cylinder is closed at its lower end by a plug 950. A pipe 952 (Fig. 20) conducts fluid from the previously mentioned pipe 934 to the cylinder 946 through a port 954 (Fig. 21), and a needle valve 956 adjustably restricts the flow of fluid through this port to determine the speed of the movement of the piston 948 under the force applied thereto by the block 942. It will be understood that initially the fluid in the cylinder 946 is under the same pressure as that in the manifold but that since the piston 948 is of smaller diameter than the piston formed by the upper end of the post 880 and the plug 888 the downward movement of the post is only retarded. Movement of the piston 948 in opposite directions is limited by a stud 958 extending into a slot 960 in the piston. In Fig. 21 the piston is shown in its lowest position, but it will be understood that when the fluid in the manifold is under pressure the piston is in its uppermost position ready to be engaged by the block 942 when the post is moved downwardly.

To limit the upward movement of the post 880 under the influence of the spring 886 a fibre washer 962 (Fig. 2) extending around the post on top of the carrier 878 is arranged to engage a shoulder 964 on the portion of the frame in which the cylinder 882 (Fig. 26) is located, as in the construction shown in Letters Patent No. 2,324,509. To prevent objectionable shock of impact of the washer against the shoulder a cap 966 (Fig. 26) which closes the upper end of the cylinder 882 and serves as a head on the cylinder is formed to provide therein a cylinder 968 in which is mounted a piston 970. Within this piston are two springs 972 and 974 which tend to move it downwardly, its downward movement being limited by a pin 976 extending into a vertical slot 978 in the piston. The interior of the upper end of the cylinder 882 is in communication through a passageway 980 and a port 982 with the upper end of the cylinder 968, and accordingly when fluid is forced into the cylinder 882 to impart downward movement to the post 880 some of it passes into the cylinder 968 and assists the springs 972 and 974 in forcing the piston 970 downward simultaneously with the downward movement of the post. When the post 880 is returned by the spring 886 a nut 984 on its upper end engages the piston 970 near the end of its upward movement and forces the piston upwardly against the resistance of the fluid in the cylinder 962 and against the resistance of the two springs. It will be understood that fluid is thus forced out of the cylinder 962 through the port 982 and the passageway 980. To vary the retarding action of the piston 970 a needle valve 986 in the cap 966 variably restricts passage of the fluid through the port 982. To assist in controlling the spring 974 a rod 988 extends part way downward within the spring.

The stop member 896 (Fig. 24) which limits the downward movement of the post 880 is supported on the rounded upper end of a screw 990 which is seated in a recess therein and the stop member is held against turning movement on the screw 990 by a screw 992 which is threaded in the frame and extends through a slot in the stop member. The screw 990 is threaded in one arm 994 of a three-armed lever 996 pivotally mounted on a pin 998 on the frame, and another arm 1000 of this three-armed lever has threaded therein a screw 1002 arranged to engage a wear plate 1004 on the frame to adjust the lever 996 about the pin 998 and thus to vary the limit of the downward movement of the post 880. Fast on the screw 1002 is a sprocket wheel 1006 connected by a chain 1008 to another sprocket wheel 1010 which is fast on a shaft 1012 mounted in bearings in the frame and having thereon a hand wheel 1014 at the front of the frame for turning it. To prevent the stop member 896 from being adjusted to such a low position that the upper-trimming means might be damaged in its operation, a third arm 1016 of the three-armed lever 996 is arranged to engage a boss 1018 on the frame.

Figure 25:
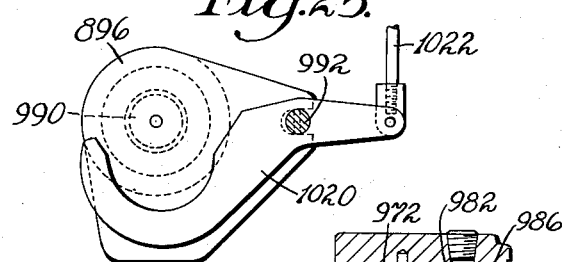
Fig. 25 is a section on the line XXV—XXV of Fig. 24.

In the use of the machine it may occasionally be necessary, after the lasting of the toe end of a shoe, to detach the toe end of the upper from the insole and to operate on the shoe a second time. In order to avoid any danger of damage to the outer layer of the upper materials by the upper-trimming means in thus operating on the shoe the second time, an auxiliary stop member 1020 (Figs. 24 and 25) is supported on top of the stop member 896 and is pivotally mounted on the screw 992 for swinging movement from a normal idle position into position to engage the lower end of the post 880 and thus to prevent the full downward movement of the upper-trimming means. Pivotally connected to the auxiliary stop member is a link 1022 which is connected by a bell-crank lever (not shown) to a forwardly extending link 1024, and this link is connected by a bell-crank lever 1026 to an upwardly extending link 1028. The link 1028 is pivotally connected to an arm 1030 fast on a shaft 1032 which is mounted in the front portion of the frame, and fast on the front end of this shaft is an arm 1034 by which the auxiliary stop member is moved either into or out of operative position. A spring-pressed pin 1036 in this arm is arranged to enter one or the other of two holes in the frame, one of which is shown at 1038 in Fig. 1, to retain the auxiliary stop member in either its idle position or its operative position. It will be evident that when this member is in its operative position it will also prevent the full downward movement of the post 880 and the carrier 878 thereon when the cement-applying means 876 is moved toward the shoe. In view, however, of the yieldable manner in which the cement-applying means is mounted on the carrier, as hereinafter described, the cement-applying means will satisfactorily perform its function when the shoe is operated on the second time.

The upper-trimming means 874 includes a trimming knife 1040 (Fig. 44) movable lengthwise of the shoe and a pair of other upper-trimming knives 1042 movable widthwise of the shoe outwardly over the wipers. Since these knives are not readily accessible to the operator to permit their removal and the substitution of other knives when the parts of the machine are in their initial positions, there is provided means which may be used to hold the carrier 878 against the resistance of the return spring 918 (Fig. 20) in a position near that which it assumes when the cement-applying means on the carrier is over the shoe. This holding means comprises an arm 1044 pivotally mounted at 1046 on the cylinder 902, the arm having thereon an abutment face 1048 arranged to engage the upper end portion of the pin 906 after the post 880 has been turned by the piston 900 in a clockwise direction with reference to Fig. 20 and after the arm 1044 has been swung into position for the face 1048 to engage the pin. Pivotally connected to a projection 1050 on the arm 1044 is a rod 1052 which extends outwardly through the left-hand side of the frame and has a knob 1054 on its outer end. Between the frame and a collar 1056 fast on the rod is a compression spring 1058. The knob 1054 is within reach of the operator as he stands at the front of the machine, and after the post 880 has been turned as above described by the piston 900 he pulls on the rod 1052 to swing the arm 1044 into position to engage the pin 906 and prevent any substantial reverse turning movement of the post by the spring 918 when the fluid is released from the cylinder 902. The abutment face 1048 is in such angular relation to the arm 1044 that by its frictional engagement with the pin 906 it will prevent return movement of the arm regardless of the spring 1058. After the operator has changed the trimming knives he swings the carrier 878 by hand enough to release the pin 906 from engagement with the arm 1044, whereupon the arm is swung to its idle position by the spring 1058 and the carrier, when released by the operator, is returned to its initial position by the spring 918.

The cement-applying means 876 is in most respects generally similar to that disclosed in Letters Patent No. 2,324,509 as modified by the disclosure of Letters Patent No. 2,377,387. It comprises a cement receptacle 1060 (Fig. 33) in which thermoplastic cement is maintained in a heated condition, this receptacle being pivotally supported by rods 1062 and 1064 on the front ends of parallel links 1066 and 1068. These links are supported at their rear ends respectively on rods 1070 and 1072 on the carrier 878. Threaded in an ear 1074 on the rear end of the link 1066 is a screw 1076 bearing at its lower end on a spring 1078 which is mounted in a socket in the carrier 878. This spring, therefore, tends to swing the links downwardly, the limit of such downward movement of the links and of the cement receptacle 1060 being adjustably determined by a screw 1080 which is threaded in an ear formed on the link 1066 and engages a vertical face on the carrier 878. Supported on the lower end of the cement receptacle is a substantially U-shaped member 1082 arranged to engage the toe end of the insole and provided with a plurality of openings 1084 through which the cement is applied to the shoe. After engagement of the member 1082 with the insole the spring 1078 is yieldable to permit further downward movement of the carrier 878. The member 1082 is provided with an inclined face 1086 against which the margin of the upper is pressed by the wipers 710 when they are advanced and closed inwardly over the insole, and by the pressure thus applied to the member 1082 this member and the cement receptacle are forced upwardly against the resistance of the spring 1078 to permit the wipers to move inwardly under the member 1082 (Fig. 42) and thus to wipe the margin of the upper throughout its width down on the insole. The member 1082 accordingly acts as a retarder to insure that the upper will be wiped tightly and smoothly over the insole by the wipers. Provision is afforded for a short inward movement of the member 1082 and the cement receptacle lengthwise of the shoe against the resistance of a spring 1088 in response to the pressure of the wipers against this member, in the same manner as disclosed in Letters Patent No. 2,377,887, this spring corresponding to the spring 436 shown in said Letters Patent.

The cement is delivered through the openings 1084 in the member 1082 by downward movement of a pump plunger 1090 which corresponds to the plunger 978 shown in Letters Patent No. 2,324,509, such downward movement being imparted to the plunger in response to the downward movement of the carrier 878. For thus operating the plunger there is provided a lever 1092 corresponding to the lever 990 shown in the last-mentioned Letters Patent, this lever being mounted to swing about the rod 1070 on the carrier 878 and having a downwardly extending curved arm 1094 provided at its lower end with a roll 1095 (Fig. 2) which engages a fixed member and thus causes the lever to swing in a counterclockwise direction with reference to Fig. 33 against the resistance of a spring 1096 in response to the downward movement of the carrier. In the construction herein shown the lever 1092 has an upwardly extending arm 1098 pivotally connected to a sleeve 1100 which is slidably movable on a rod 1102 and normally engages a nut 1104 on the rear end of the rod. Between the sleeve 1100 and a block 1106 to which the front end of the rod 1102 is secured is a spring 1108. The block 1106 is pivotally connected to the upper end of a lever 1110 which is mounted to swing on the rod 1062 and is normally in engagement at its lower end with a vertical face 1112 on the receptacle 1060. Mounted to swing with the lever 1110 is an arm 1114 having a pin-and-slot connection (not shown) with the upper end of the pump plunger 1090. It will accordingly be understood that in response to the downward movement of the carrier 878 the pump plunger is forced downwardly to deliver the cement by the action of the lever 1092 on the lever 1110 through the spring 1108 and that in response to upward movement of the carrier the pump plunger is returned by the action of the spring 1096 on the lever 1092 by reason of engagement of the sleeve 1100 with the nut 1104.

Figure 15:
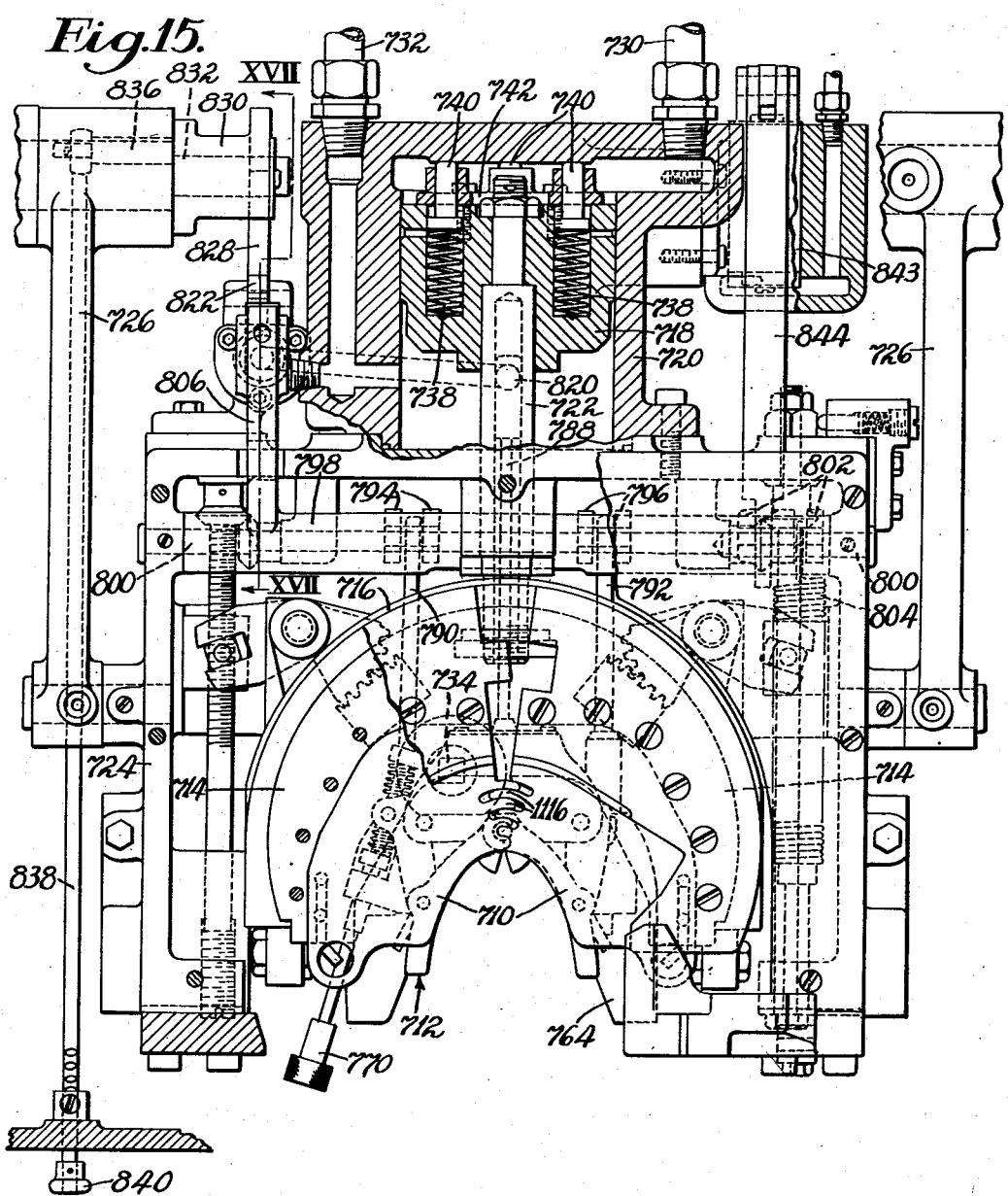
Fig. 15 is a plan view, with parts broken away, showing the wipers and their operating mechanism.
Figure 33:
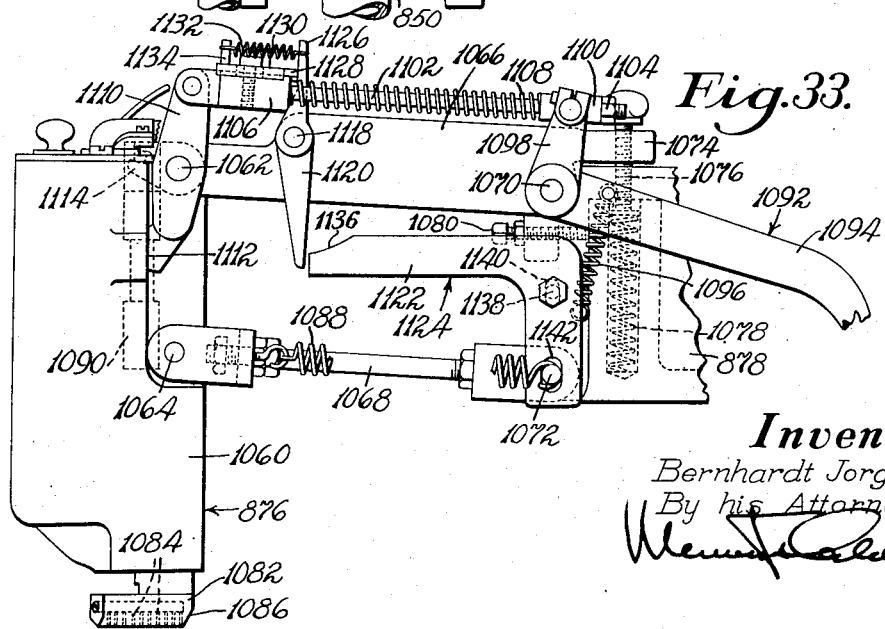
Fig. 33 is a view in right-hand side elevation of the means for applying cement to the shoe.

As shown in Fig. 15, the wipers 710 are provided as heretofore with a plurality of curved interlocking fingers 1116 to avoid any V-shaped opening between them at the extreme end of the toe when they are in their closed positions. It is desirable to prevent cement from entering the recesses in the wipers in which the fingers 1116 are movable. Accordingly, the construction herein shown includes means for preventing the member 1082 through which the cement is delivered from engaging the wipers after the margin of the upper has been withdrawn from between it and the wipers in the wiping operation. For this purpose there is pivotally mounted on a stud 1118 on one side of the link 1066 a latch 1120 the lower end of which is arranged to cooperate with a forwardly extending arm 1122 of an L-shaped member 1124 secured to the carrier 878. The latch has a finger 1126 extending upwardly above the stud 1118 and arranged to engage a projection 1128 formed on a plate 1130 which is adjustably secured to the block 1106. The finger 1126 is connected by a spring 1132 to a pin 1134 on the plate 1130, and initially the finger is held by the spring against the projection 1128 on the plate, as shown in Fig. 33, the latch 1120 being out of contact with the arm 1122. As the lever 1092 is operated in the manner above described in response to the downward movement of the carrier 878, the block 1106 is moved forwardly and through the spring 1132 the latch 1120 is swung into engagement with the front end of the arm 1122. As the carrier 878 continues to move downward a short distance after the member 1082 has engaged the insole the arm 1122 moves downward relatively to the latch 1120, and as the member 1082 and the cement receptacle are thereafter forced upward by the action of the wipers in wiping the margin of the upper inwardly, the latch is moved upward relatively to the arm. Accordingly, the latch arrives in such a position that it is swung inward by the spring 1132 over a curved face 1136 on the arm. This curved face is in such eccentric relation to the axis of the stud 1118 that the lower end of the latch engages it at a point the location of which depends upon how far the member 1082 is forced upwardly by the wipers acting thereon through the upper. The latch, therefore, prevents any downward movement of the cement receptacle and the member 1082 after the margin of the upper has been withdrawn from between this member and the wipers by the inward movements of the wipers and, accordingly, prevents the member 1082 from engaging the top faces of the wipers, as shown in Fig. 43. It will be understood that when the carrier 878 is thereafter moved upwardly the latch 1120 is returned to its initial position by engagement of the projection 1128 on the plate 1130 with the finger 1126. The L-shaped member 1124 is adjustably secured to the carrier 878 by a screw 1138 extending through a slot 1140 in the member, and to assist in positioning it the member is further provided with a slot 1142 through which one end of the rod 1072 extends.

The mechanism for operating the grippers 218 and 220 (Fig. 14) to pull the upper is, for the most part, of substantially the same construction as disclosed in Letters Patent No. 2,324,509 and will therefore be only briefly described. The cylinders 222 and 226 on which the grippers are mounted are slidingly movable on a support 1144 controlled as hereinafter described, the cylinder 222 being thus movable lengthwise of the last and the cylinders 226 widthwise of the last. Each of the cylinders 226 is moved in an outward direction to cause the gripper thereon to pull the upper by a lever 1146 pivotally mounted on a stud 1148 on the support 1144, the lever 1146 being operated yieldingly through a spring 1150 by a shorter lever 1152 mounted on the same stud. The right-hand lever 1152 is operated against the resistance of a return spring 1153 by a piston 1154 movable in a cylinder 1156 fast on the support 1144, this cylinder receiving operating fluid from a conduit 1158 leading from one of the previously mentioned valves adjacent to the manifold 4. The left-hand lever 1152 is similarly operated by a piston 1160 movable in a cylinder 1162 which, in the construction herein shown, also is fast on the support 1144 and has therein another piston 1164 for operating the end gripper 218 against the resistance of a return spring 1165, this piston acting on a lever 1166 pivotally mounted on a stud 1168 and connected to the cylinder 222. Fluid is admitted to the cylinder 1162 from the conduit 1158 through a tube 1170.

The gripper support 1144 is pivotally mounted at its rear end for swinging movement heightwise of the last on two pins 1172 (Figs. 2 and 14) which are supported on upwardly extending arms 1174 of a lever 1176 secured to a rockshaft 1178 for swinging movements lengthwise of the last for a purpose hereinafter explained. In addition to the previously described movements of the grippers along the support 1144 to pull the upper, provision is afforded as heretofore for also moving them heightwise of the last to pull the upper in that direction by upward swinging movement of the support. Initially the support rests at its front end on a stop member 1180 in the form of a bell-crank lever pivotally mounted at 1182 on the frame and adjustable by a screw 1184 threaded in the frame. For swinging the support upwardly away from this stop member there is provided, in the construction herein shown, a piston 1186 (Fig. 20) vertically movable in a cylinder 1188 (see also Fig. 2) on the frame. Extending through the piston and through slots in the cylinder, one of which is shown at 1190 in Fig. 2, is a pin 1192 having pivotally mounted on its opposite ends a pair of downwardly extending links 1194. Extending through vertical slots in these links, one of which slots is shown at 1196 in Fig. 2, are pins 1198 which are mounted in the bifurcated front end portion of an arm 1200 fast on a rockshaft 1202 mounted in bearing blocks 1204 on the frame. Pivotally connected to a forward extension of one of the forks of the arm 1200 is an upwardly extending link 1206 which is pivotally connected at its upper end to the left-hand side portion of the gripper support 1144. Also fast on the rockshaft 1202 is another arm 1208 connected by a similar upwardly extending link 1210 to the right-hand side portion of the support 1144. It will thus be seen that when the piston 1186 is moved upwardly by fluid admitted to the lower end of the cylinder 1188 it acts through the links 1194 to impart upward swinging movements to both the arms 1200 and 1208 and thereby to impart upward swinging movement to the gripper support 1144 to cause the grippers to pull the upper in that direction. Fluid is thus admitted to the cylinder 1188 from a pipe 1212 which is preferably in communication with the previously mentioned conduit 1158 (Fig. 14) through which fluid is supplied for moving the grippers relatively to the support 1144.

To insure that the gripper support 1144 will be moved upwardly far enough for the gripper jaws to clear the wipers when the wiper support 724 is at the end of its upward movement, regardless of the resistance of the upper to the upward movement of the gripper support by the piston 1186, the wiper support has thereon, as heretofore, a pair of screws 1214, one of which is shown in Fig. 2, for engaging and imparting further upward movement to the gripper support near the end of the upward movement of the wiper support. The slots 1196 in the links 1194 permit such further upward movement of the gripper support.

Figure 40:
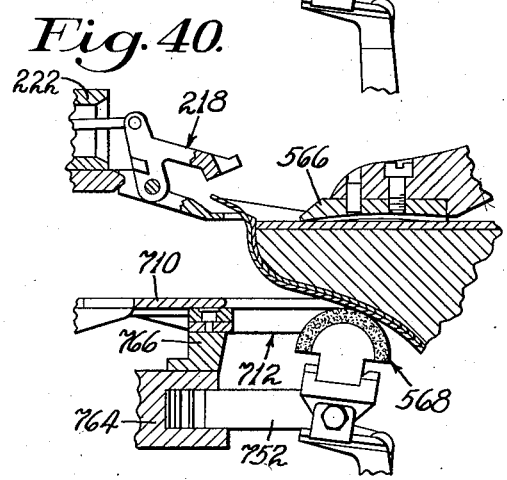

As explained in Letters Patent No. 2,377,887, after the toe end of the upper has been conformed to the contour of the last by the first upward movement of the toe former 712, it tends to retain the shape imparted to it and its outturned margin is therefore positioned higher for the grippers to grip it the second time than when it is gripped the first time, as illustrated in Fig. 40. The machine is therefore provided with means for positioning the grippers somewhat higher when they grip the upper the second time than when they grip it the first time, this means being of different construction from that shown for the same purpose in the last-mentioned Letters Patent. Pivotally mounted on a pin 1216 on the casting 674 (Figs. 2 and 20) is a latch 1218 arranged to engage the upper end of an arm 1220 fast on the rockshaft 1202 to prevent the full downward movement of the gripper support 1144 when the support is moved downward preparatory to the gripping of the upper the second time. The latch 1218 is in the form of a bell-crank lever and has a downwardly extending arm arranged to be engaged by one end of a rod 1222 slidingly mounted in the casting 674. Initially the other end of this rod is engaged by the cross rod 668 through which the heel rest 660 is moved into engagement with the shoe as hereinbefore described, and when the parts are thus positioned the latch 1218 is held out of engagement with the arm 1220, as shown in Fig. 2. When the heel rest is moved into engagement with the shoe near the beginning of the cycle of operations the rod 1222 is released by the cross rod 668, thus permitting the latch 1218 to be swung by gravity into engagement with the arm 1220. When the gripper support 1144 is thereafter swung upwardly by the piston 1186, the movement of the arm 1220 permits the latch to swing farther downwardly into position to prevent the full return movement of the support. It will be understood that when the heel rest is returned to its initial position near the end of the cycle the cross rod 668 returns the latch to its initial position, thus permitting the gripper support to move downwardly to the position determined by the stop member 1180. To vary the height of the gripper support when the grippers grip the upper the second time, the arm 1220 is adjustable about the rockshaft 1202. For this purpose the portion of the arm which is next to the rockshaft is extended along the shaft and has thereon an upstanding lug 1224 secured to a similar upstanding lug 1226 on a corresponding portion of the arm 1200 by a bolt 1228, this bolt having in the lug 1224 an eccentric portion 1230 for adjusting the arm 1220 by turning movement of the bolt.

Mechanism of different construction from that shown in Letters Patent No. 2,377,887 is provided for further imparting to all three grippers as a unit a short upper-pulling movement lengthwise of the last by movement of the gripper support 1144 in a rearward direction. Reference has been made to the fact that the gripper support is pivotally mounted at its rear end on the two arms 1174 of the lever 1176 secured to the rockshaft 1178. A spring 1232 connected to one arm of this lever and to one of the links 726 holds the lever initially in a position determined by engagement of a screw 1234 in that arm with the rear end of the link. Extending upwardly from this link is a flange 1236 to which is secured a member 1238, and rotatably mounted in this member is a pin 1240 having an eccentric portion 1242. It will be understood that as the wiper support 724 is moved upwardly the swinging movement of that link 726 which carries the member 1238 causes this member to swing in a rearward direction. This causes the eccentric portion 1242 of the pin 1240 to engage a block 1244 (see Fig. 14) fast on the gripper support 1144 and to move the latter a short distance in a rearward direction, the lever 1176 swinging rearwardly against the resistance of the spring 1232. To vary the amount of rearward movement imparted in this manner to the gripper support the pin 1240 may be turned to adjust its eccentric portion 1242 by means of an arm 1246 which is fast on the pin, this arm being retained in adjusted position by a spring-pressed pin (not shown) which is mounted therein and is arranged to enter one or another of a plurality of holes 1248 in the member 1238.

While the machine has been thus far described as performing a cycle of operations in the course of which the grippers pull the toe end of the upper both before and after the upper-trimming operation and the toe former wipes the upper heightwise of the last also before and after that operation, in accordance with the disclosure of Letters Patent No. 2,377,887, provision is afforded for altering the cycle, if desired, to cause the grippers and the toe former thus to operate on the upper only before the upper-trimming operation, as in the construction shown in Letters Patent No. 2,324,509. It will be understood that the pulling of the upper by the grippers is controlled by that one of the previously mentioned valves whereby fluid is admitted to the cylinders 1156 and 1162 (Fig. 14) and is later released therefrom, and that the wiping of the upper heightwise of the last by the toe former is controlled by that one of the valves which admits fluid to the cylinders 848 (Fig. 1) and releases it therefrom. Associated with each of these valves are two valve-controlling cams, one for causing the successive operations described and the other the single operation. The cam which causes the grippers to pull the upper twice is shown at 1250 in Fig. 1a, and that which causes them to pull the upper only once is shown at 1252. Similarly, the cam which causes the toe former to act twice on the upper is shown at 1254, and that which causes it to act only once is shown at 1256. If the toe former is to act twice on the upper, it is necessary that it be retracted from the shoe lengthwise thereof, in accordance with the disclosure of Letters Patent No. 2,377,887, before it is moved downward preparatory to its second upward movement, so as to avoid any objectionable drag on the upper in its downward movement. As hereinbefore explained, such retractive movement of the toe former results from the admission of fluid to the cylinder 812 (Fig. 17) under control of the valve which admits fluid also to the front end of the cylinder 720 (Fig. 15). Accordingly, there are further provided two cams for controlling this valve, a cam 1258 for controlling it when the toe former is to act twice in the cycle and a cam 1260 for controlling it when the toe former is to act only once. All the above-mentioned cams are secured to a sleeve 1272 which is keyed to the control shaft 2 and is slidingly movable along the shaft to different positions. The cams are clamped and held between an enlarged end portion of the sleeve and a nut 1264 threaded on the other end of the sleeve. Formed in the enlarged end portion is a groove 1266 into which extends a pin 1268 mounted in the lower end of a lever 1270 which is pivotally mounted at 1272 on a bracket 1274 on the frame. The upper end of the lever 1270 has a pin-and-slot connection 1276 with a short arm 1278 which is fast on a shaft 1280 in the frame, and also fast on this shaft is a crank arm 1282 by which the shaft may be turned to move the sleeve 1262 and the group of cams thereon to different positions. A spring-pressed pin (not shown) in the crank arm 1282 is arranged to enter one or the other of two holes in the frame, one of which is shown at 1284, to hold the cams in their different positions. As the parts are shown in the drawings, the cams are in the positions which they occupy when the grippers and the toe former are to act on the upper twice in the cycle, and it will be understood that by swinging the crank arm 1282 upwardly the cams are moved to the positions which they occupy when the grippers and the toe former act only once in the cycle. The gripper-closing cam 282 (Figs. 4 and 5) is formed, as hereinbefore described, to close the grippers invariably a second time, but when the adjustment of the above-mentioned cams is such that the grippers are operated to pull the upper only once in the cycle, the second closing of the grippers takes place idly at a time when they are in such positions that there is no upper between their jaws.

While the piston 843 (Fig. 15) is operated as hereinbefore described to force the toe former more firmly against the shoe after each of its upward movements when the cycle is such that it receives two such movements, it is controlled no differently when the cycle is such that the toe former is moved upwardly only once, since in that case the toe former is at the end of its single upward movement and in engagement with the upper both times when the piston acts thereon.

Since the manner of operation of the portions of the machine in which the novel features of the invention are embodied has already been fully explained in connection with the description of the structure, and since the cycle of operations does not differ in any substantial respect from that described in Leters Patent No. 2,377,887 when the grippers and the toe former act on the upper twice in the course of the cycle and in other respects remains the same when they act only once in the cycle, no further description of the operation of the machine is necessary for an understanding of the invention.

Having described the invention, what I claim as new and desire to secure by Letters Patent of the United States is:

1. In a lasting machine, upper-gripping means for applying a pull to an upper on a last in the course of a cycle of power operations of the machine, fluid-operated means for closing said upper-gripping means on the upper, a source of supply of operating fluid, a valve movable to admit fluid from said source to said fluid-operated means to close the upper-gripping means prior to the starting of the cycle of operations, a lever mounted for swinging movement thus to move said valve, a treadle lever mounted to swing about the same axis as said first-named lever to operate the latter and reversely movable relatively to the first-named lever, a valve movable to start the cycle of operations, a third lever movable about said axis thus to move said last-named valve, a member carried by said treadle lever for thus operating said third lever, another lever also movable about said axis by the treadle lever, and a bell-crank lever controlled by said other lever for preventing said member from thus acting on said third lever until after the first movement of the treadle lever and its reverse movement.

2. In a lasting machine, upper-gripping means for applying a pull to an upper on a last in the course of a cycle of power operations of the machine, fluid-operated means for closing said upper-gripping means on the upper, a source of supply of operating fluid, a valve movable to admit fluid from said source to said fluid-operated means to close the upper-gripping means prior to the starting of the cycle of operations, a lever mounted for swinging movement thus to move said valve, a treadle lever mounted to swing about the same axis as said first-named lever to operate the latter and reversely movable relatively to the first-named lever, a valve movable to start the cycle of operations, a third lever movable about said axis thus to move said last-named valve, a latch carried by said treadle lever for thus operating said third lever, a device for holding said latch in position to prevent it from acting on the third lever in the first movement of the treadle lever, another lever also movable about said axis by the treadle lever, said device being mounted to move relatively to said other lever, and means for thus moving said device by said other lever to release the latch in response to the first movement of the treadle lever to permit the starting of the cycle of operations by a second operative movement of the treadle lever after its reverse movement.

3. In a lasting machine, upper-gripping means for applying a pull to an upper on a last in the course of a cycle of power operations of the machine, fluid-operated means for closing said upper-gripping means on the upper, a source of supply of operating fluid, a valve movable to admit fluid from said source to said fluid-operated means to close the upper-gripping means prior to the starting of the cycle of operations, a lever mounted for swinging movement thus to move said valve and also for return movement, a treadle lever mounted to swing about the same axis as said first-named lever, a latch carried by the treadle lever for engaging and operating the first-named lever by a movement of the treadle lever, means for starting the machine by another movement of the treadle lever and for also starting it again by a third movement of the treadle lever by the operator after a pause in the cycle of operations and after return movement of the first-named lever, another lever also movable about said axis by the treadle lever, and means controlled by said other lever for holding said latch in position to prevent it from operating the first-named lever when the treadle lever receives said third movement.

4. In a lasting machine, upper-gripping means for applying a pull to an upper on a last in the course of a cycle of power operations of the machine, fluid-operated means for closing said upper-gripping means on the upper, a source of supply of operating fluid, a valve movable to admit fluid from said source to said fluid-operated means to close the upper-gripping means prior to the starting of the cycle of operations, a lever mounted for swinging movement thus to move said valve and also for return movement, a treadle lever mounted to swing about the same axis as said first-named lever, a latch carried by the treadle lever for engaging and operating the first-named lever by a movement of the treadle lever, a valve movable to start the machine, means for thus moving said valve by another movement of the treadle lever and for also moving it to start the machine again by a third movement of the treadle lever by the operator after a pause in the cycle of operations and after return movement of the first-named lever, and another lever also movable about said axis by the treadle lever and arranged to hold said latch in position to prevent it from operating the first-named lever when the treadle lever receives said third movement.

5. In a lasting machine, upper-gripping means for applying a pull to an upper on a last in the course of a cycle of power operations of the machine, fluid-operated means for closing said upper-gripping means on the upper, a source of supply of operating fluid, a valve movable to admit fluid from said source to said fluid-operated means to close the upper-gripping means prior to the starting of the cycle of operations, a lever mounted for swinging movement thus to move said valve, a treadle lever mounted to swing about the same axis as said first-named lever to operate the latter, a valve movable to cause the development of operating pressure at said source, and a third lever also movable about said axis to operate the last-named valve, said third lever being arranged to be operated by the first-named lever and the first-named lever being reversely movable independently of said third lever.

6. In a lasting machine, upper-gripping means for applying a pull to an upper on a last in the course of a cycle of power operations of the machine, fluid-operated means for closing said upper-gripping means on the upper, a source of supply of operating fluid, a valve movable to admit fluid from said source to said fluid-operated means to close the upper-gripping means prior to the starting of the cycle of operations, another valve movable to cause the development of operating pressure at said source, a third valve movable to start the cycle of operations, three levers mounted to swing about the same axis and associated respectively with said different valves for thus operating them, a treadle lever also mounted to swing about said axis, means for operating two of said levers by one operative movement of said treadle lever to cause the closing of the upper-gripping means and the development of operating pressure, and means for operating the third lever to start the cycle of operations only in response to a second operative movement of said treadle lever after a reverse movement thereof.

7. In a lasting machine, upper-gripping means for applying a pull to an upper on a last in the course of a cycle of power operations of the machine, fluid-operated means for closing said upper-gripping means on the upper, a source of supply of operating fluid, a valve movable to admit fluid from said source to said fluid-operated means to close the upper-gripping means prior to the starting of the cycle of operations, a second valve movable to cause the development of operating pressure at said source, a third valve movable to start the cycle of operations, means movable by the operator thus to move said valves, devices associated respectively with the different valves for holding them against return movements, and a rockshaft optionally movable by the operator and having thereon arms arranged to act respectively on said devices to cause them to release the several valves.

8. In a lasting machine, upper-gripping means for applying a pull to an upper on a last in the course of a cycle of power operations of the machine, fluid-operated means for closing said upper-gripping means on the upper, a source of supply of operating fluid, a valve movable to admit fluid from said source to said fluid-operated means to close the upper-gripping means prior to the starting of the cycle of operations, a second valve movable to cause the development of operating pressure at said source, a third valve movable to start the cycle of operations, means movable by the operator thus to move said first and second valves prior to the starting of the cycle of operations and thereafter to move the third valve to start the cycle, devices associated respectively with the several valves for holding them against return movements, and a treadle-operated rockshaft optionally movable by the operator and having thereon arms arranged to act respectively on said devices to cause the release of said first-named and second valves prior to the starting of the cycle or the release of all the valves after the starting of the cycle.

9. In a lasting machine, means for shaping an upper over a last in the course of a cycle of power operations of the machine, a shoe-positioning device arranged to engage the bottom of the forepart of the shoe, a toe rest for clamping the shoe against said device, power-operated means for applying said toe rest to the shoe with comparatively light pressure prior to the starting of the cycle of operations, and additional power-operated means for causing the toe rest to press more firmly against the shoe after the starting of the cycle.

10. In a lasting machine, means for shaping an upper over a last in the course of a cycle of power operations of the machine, a shoe-positioning device arranged to engage the bottom of the forepart of the shoe when the shoe is presented to the machine by the operator, a toe rest for clamping the shoe against said device, power-operated means for moving said toe rest into engagement with the shoe and forcing it against the shoe with comparatively light pressure while the operator is holding the shoe prior to the starting of the cycle of operations, and additional power-operated means for causing an increase in the pressure of the toe rest on the shoe after the starting of the cycle.

11. In a lasting machine, means for shaping an upper over a last in the course of a cycle of power operations of the machine, a shoe-positioning device arranged to engage the bottom of the forepart of the shoe, a toe rest for clamping the shoe against said device, fluid-operated means for applying said toe rest to the shoe with comparatively light pressure prior to the starting of the cycle of operations, and additional fluid-operated means for pressing the toe rest more firmly against the shoe after the starting of the cycle.

12. In a lasting machine, means for shaping an upper over a last in the course of a cycle of power operations of the machine, a shoe-positioning device arranged to engage the bottom of the forepart of the shoe, a toe rest for clamping the shoe against said device, a fluid-operated piston for applying said toe rest to the shoe with comparatively light pressure prior to the starting of the cycle of operations, and another fluid-operated piston of greater diameter than said first-named piston for pressing the toe rest more firmly against the shoe after the starting of the cycle.

13. In a lasting machine, means for shaping an upper over a last in the course of a cycle of power operations of the machine, a shoe-positioning device arranged to engage the bottom of the forepart of the shoe, a toe rest for clamping the shoe against said device, a fluid-operated piston for moving said toe rest into engagement with the shoe and forcing it against the shoe with comparatively light pressure prior to the starting of the cycle of operations, and another fluid-operated piston arranged to support the toe rest initially and relatively to which the toe rest is thus movable by said first-named piston, said other piston being of greater diameter than the first-named piston for pressing the toe rest more firmly against the shoe after the starting of the cycle.

14. In a lasting machine, upper-gripping means for applying a pull to an upper on a last in the course of a cycle of power operations of the machine, fluid-operated means for closing said upper-gripping means on the upper prior to the starting of the cycle of operations, a shoe-positioning device arranged to engage the bottom of the forepart of the shoe, a toe rest for clamping the shoe against said device, fluid-operated means for applying said toe rest to the shoe with comparatively light pressure simultaneously with the closing of said upper-gripping means on the upper, and additional fluid-operated means for causing the toe rest to press more firmly on the shoe after the starting of the cycle of operations.

15. In a lasting machine, upper-gripping means for applying a pull to an upper on a last in the course of a cycle of power operations of the machine, fluid-operated means for closing said upper-gripping means on the upper prior to the starting of the cycle of operations, a shoe-positioning device arranged to engage the bottom of the forepart of the shoe when the shoe is presented to the machine by the operator, a toe rest for clamping the shoe against said device, fluid-operated means for applying said toe rest to the shoe with comparatively light pressure while the operator is holding the shoe simultaneously with the closing of said upper-gripping means on the upper, and additional fluid-operated means for increasing the pressure of the toe rest on the shoe after the starting of the cycle of operations.

16. In a lasting machine, upper-gripping means for applying a pull to an upper on a last in the course of a cycle of power operations of the machine, fluid-operated means for closing said upper-gripping means on the upper prior to the starting of the cycle of operations, a member movable by the operator to cause such closing of the upper-gripping means, a shoe-positioning device arranged to engage the bottom of the forepart of the shoe, a toe rest for clamping the shoe against said device, fluid-operated means for applying said toe rest to the shoe with comparatively light pressure in response to the movement of said member, and additional fluid-operated means for increasing the pressure of the toe rest on the shoe after the starting of the cycle of operations.

17. In a lasting machine, upper-gripping means for applying a pull to an upper on a last in the course of a cycle of power operations of the machine, fluid-operated means for closing said upper-gripping means on the upper prior to the starting of the cycle of operations, a member movable by the operator to cause such closing of the upper-gripping means, a shoe-positioning device arranged to engage the bottom of the forepart of the shoe, a toe rest for clamping the shoe against said device, a fluid-operated piston of comparatively small diameter for applying said toe rest to the shoe with comparatively light pressure in response to the movement of said member, and another fluid-operated piston of greater diameter than said first-named piston for pressing the toe rest more firmly against the shoe after the starting of the cycle of operations.

18. In a lasting machine, means for shaping an upper over a last in the course of a cycle of power operations of the machine, a heel rest for engaging the heel end of the shoe to assist in holding it against lengthwise displacement, a member subject to pressure of fluid thereon for moving said heel rest lengthwise of the shoe into engagement therewith and for forcing it against the shoe with comparatively light pressure prior to the starting of the cycle of operations, and another member having a greater area subject to effective pressure of fluid thereon than said first-named member for forcing the heel rest more firmly against the shoe after the starting of the cycle.

19. In a lasting machine, means for shaping an upper over a last in the course of a cycle of power operations of the machine, a heel rest for engaging the heel end of the shoe to assist in holding it against lengthwise displacement, a fluid-operated piston for moving said heel rest lengthwise of the shoe into engagement therewith and for forcing it against the shoe with comparatively light pressure prior to the starting of the cycle of operations, and another fluid-operated piston of greater diameter than said first-named piston for forcing the heel rest more firmly against the shoe after the starting of the cycle.

20. In a lasting machine, means for shaping an upper over a last in the course of a cycle of power operations of the machine, a heel rest for engaging the heel end of the shoe to assist in holding it against lengthwise displacement, a cylinder of comparatively small diameter, a fluid-operated piston in said cylinder for moving said heel rest lengthwise of the shoe into engagement therewith and for forcing it against the shoe with comparatively light pressure prior to the starting of the cycle of operations, another cylinder of greater diameter than said first-named cylinder, a member connected to the heel rest and mounted in said other cylinder to be moved lengthwise thereof as the heel rest is thus moved by said piston, and a fluid-operated piston in said other cylinder movable into engagement with said member after the starting of the cycle of operations to force the heel rest more firmly against the shoe.

21. In a lasting machine, upper-gripping means for applying a pull to an upper on a last in the course of a cycle of power operations of the machine, fluid-operated means for closing said upper-gripping means on the upper prior to the starting of the cycle of operations, a member movable by the operator to cause such closing of the upper-gripping means, a heel rest for engaging the heel end of the shoe to assist in holding it against lengthwise displacement, fluid-operated means for moving said heel rest lengthwise of the shoe into engagement therewith and for forcing it against the shoe with comparatively light pressure in response to the movement of said member, and additional fluid-operated means for forcing the heel rest more firmly against the shoe after the starting of the cycle.

22. In a lasting machine, the combination with means for positioning bottom upward a last having an upper and an insole thereon, of wipers for wiping the margin of the upper about an end of the last inwardly over the insole, a support for said wipers, a pair of pistons movable by the pressure of operating fluid thereon to raise said wiper support and thereby to move the wipers upwardly into positions for thus operating on the upper, means for limiting the movements of said pistons, the wiper support being arranged to be moved thereafter farther upward relatively to said pistons against the force of gravity in response to pressure of the upper on the wipers as they are moved inwardly over the insole, additional pistons of smaller diameter movably mounted in said first-named pistons and subject to the pressure of the operating fluid, means for limiting movements of the smaller pistons relatively to the first-named pistons by said pressure, and springs for transmitting force from the smaller pistons to the wiper support partially to counterbalance the weight of said support and of the parts thereon, said springs being of such strength as to prevent raising of the wiper support by the action of the fluid on the smaller pistons.

23. In a lasting machine, the combination with means for positioning bottom upward a last having an upper and an insole thereon, of wipers for wiping the margin of the upper about an end of the last inwardly over the insole, a support for said wipers, a pair of pistons movable by the pressure of operating fluid thereon to raise said wiper support and thereby to move the wipers upwardly into positions for thus operating on the upper, means for limiting the movements of said pistons, connections between said pistons and the wiper support for thus raising it, said connections including members movable relatively to the pistons to permit further upward movement of the wiper support against the force of gravity in response to pressure of the upper on the wipers as they are moved inwardly over the insole, additional pistons of smaller diameter movably mounted in said first-named pistons and subject to the pressure of the operating fluid, means for limiting movement of the smaller pistons relatively to the first-named pistons by said pressure, and springs for transmitting force from the smaller pistons to said connecting members partially to counterbalance the weight of the wiper support and of the parts thereon, said springs being of such strength as to prevent raising of the wiper support by the action of the fluid on the smaller pistons.

24. In a lasting machine, the combination with wipers for wiping the margin of an upper around an end of a last inwardly over an insole on the last, of means for applying cement to the shoe for securing the margin of the upper to the insole, said cement-applying means including a cement-applying member mounted for movement heightwise of the shoe away from the insole by pressure of the wipers and the upper thereon in the wiping operation and arranged to engage the margin of the upper outspread over the wipers before said margin is withdrawn from between it and the wipers by continued movement of the wipers, and a device for preventing reverse movement of said member into engagement with the wipers when the margin of the upper is thus withdrawn from between it and the wipers.

25. In a lasting machine, the combination with wipers for wiping the margin of an upper around an end of a last inwardly over an insole on the last, of means for applying cement to the shoe for securing the margin of the upper to the insole, said cement-applying means including a cement-applying member mounted for movement heightwise of the shoe away from the insole by pressure of the wipers and the upper thereon in the wiping operation and arranged to engage the margin of the upper outspread over the wipers before said margin is withdrawn from between it and the wipers by continued movement of the wipers, a latch mounted to move bodily heightwise of the shoe with said member when the member is moved away from the insole by the wipers, and means relatively to which the latch is thus movable for engaging it to prevent reverse movement of said member into engagement with the wipers when the margin of the upper is thus withdrawn from between it and the wipers.

26. In a lasting machine, the combination with wipers for wiping the margin of an upper around an end of a last inwardly over an insole on the last, of means for applying cement to the shoe for securing the margin of the upper to the insole, said cement-applying means including a cement-applying member arranged to engage the insole, parallel links supporting said cement-applying member for movement heightwise of the shoe away from the insole by pressure of the wipers and the upper thereon in the wiping operation, said member being arranged to engage the margin of the upper outspread over the wipers before said margin is withdrawn from between it and the wipers by continued movement of the wipers, a spring-controlled latch pivotally mounted on one of said parallel links, and means for engaging said latch to prevent reverse movement of said member into engagement with the wipers when the margin of the upper is thus withdrawn from between it and the wipers.

27. In a lasting machine, the combination with wipers for wiping the margin of an upper around an end of a last inwardly over an insole on the last, of means for applying cement to the shoe for securing the margin of the upper to the insole, a carrier supporting said cement-applying means and mounted for movement heightwise of the shoe to carry said means toward the insole, said cement-applying means including a cement-applying member mounted to move heightwise of the shoe away from the insole relatively to said carrier in response to pressure of the wipers and the upper thereon in the wiping operation and arranged to engage the margin of the upper outspread over the wipers before said margin is withdrawn from between it and the wipers by continued movement of the wipers, and retaining members mounted respectively on said carrier and for movement heightwise of the shoe with said cement-applying member when said member is moved away from the insole by the wipers, said retaining members being arranged to engage each other to hold the cement-applying member against reverse movement into engagement with the wipers when the margin of the upper is thus withdrawn from between it and the wipers.

28. In a lasting machine, the combination with wipers for wiping the margin of an upper around an end of a last inwardly over an insole on the last, of means for applying cement to the shoe for securing the margin of the upper to the insole, a carrier supporting said cement-applying means and mounted for movement heightwise of the shoe to carry said means toward the insole and also for reverse movement, said cement-applying means including a cement-applying member mounted to move heightwise of the shoe away from the insole relatively to said carrier in response to pressure of the wipers and the upper thereon in the wiping operation and arranged to engage the margin of the upper outspread over the wipers before said margin is withdrawn from between it and the wipers by continued movement of the wipers, a device for holding said member against reverse movement into engagement with the wipers when the margin of the upper is thus withdrawn from between it and the wipers, and means for rendering said device inoperative thus to hold said member in response to the reverse movement of said carrier.

29. In a lasting machine, the combination with wipers for wiping the margin of an upper around an end of a last inwardly over an insole on the last, of means for applying cement to the shoe for securing the margin of the upper to the insole, a carrier supporting said cement-applying means and mounted for movement heightwise of the shoe to carry said means toward the insole and also for reverse movement, said cement-applying means including a cement-applying member mounted to move heightwise of the shoe away from the insole relatively to said carrier in response to pressure of the wipers and the upper thereon in the wiping operation and arranged to engage the margin of the upper outspread over the wipers before said margin is withdrawn from between it and the wipers by continued movement of the wipers, retaining members mounted respectively on said carrier and for movement heightwise of the shoe with said cement-applying member when said member is moved away from the insole by the wipers, said retaining members being arranged to engage each other to prevent reverse movement of the cement-applying member into engagement with the wipers when the margin of the upper is withdrawn from between it and the wipers, and means for disengaging said retaining members from each other in response to the reverse movement of said carrier.

30. In a lasting machine, a toe former for wiping the toe end of an upper on a last heightwise of the last, said toe former comprising a pair of members curved to embrace the upper around the toe end of the last and mounted for swinging movements toward or from each other about an axis extending heightwise of the last, bell-crank levers supporting said members thus to swing about said axis either toward each other in response to pressure of the end of the toe thereon or away from each other in response to pressure of the sides of the toe thereon to permit them to adjust themselves to the upper and last, and spring means controlling said bell-crank levers and yieldable in response to such swinging movements of the members either toward or from each other.

31. In a lasting machine, a toe former for wiping the toe end of an upper on a last heightwise of the last, said toe former comprising a pair of wiping members formed of rigid material for engaging the upper around the toe end of the last and pivotally connected together for swinging movements toward or from each other about an axis extending heightwise of the last, bell-crank levers supporting said members thus to swing about said axis either toward each other in response to pressure of the end of the toe thereon or away from each other in response to pressure of the sides of the toe thereon to permit them thus to adjust themselves to the upper and last, the bell-crank levers being connected together for equal swinging movements, and spring means controlling said bell-crank levers and yieldable in response to such swinging movements of the wiping members either toward or from each other.

32. In a lasting machine, a toe former for wiping the toe end of an upper on a last heightwise of the last, said toe former comprising a pair of members curved to embrace the upper around the toe end of the last and mounted for swinging movements toward or from each other about an axis extending heightwise of the last, bell-crank levers supporting said members thus to swing about said axis either toward each other in response to pressure of the end of the toe thereon or away from each other in response to pressure of the sides of the toe thereon to permit them thus to adjust themselves to the upper and last, spring means controlling said bell-crank levers and yieldable in response to such swinging movements of the members either toward or from each other, and an adjusting device arranged to act through said spring means to adjust said members toward or from each other.

33. In a lasting machine, a toe former for wiping the toe end of an upper on a last heightwise of the last, said toe former comprising a pair of members curved to embrace the upper around the toe end of the last and mounted for swinging movements toward or from each other about an axis extending heightwise of the last, means supporting said members thus to swing about said axis either toward each other in response to pressure of the end of the toe thereon or away from each other in response to pressure of the sides of the toe thereon to permit them thus to adjust themselves to the upper and last, a coil spring yieldable in response to swinging movements of the members toward each other, another coil spring in alignment with said first-named spring and yieldable in response to swinging movements of the members away from each other, and a rotatable screw-threaded member extending through said springs and arranged to act through the springs to adjust the members toward or from each other.

34. In a lasting machine, a toe former for wiping the toe end of an upper on a last heightwise of the last, said toe former comprising a pair of members curved to embrace the upper around the toe end of the last and mounted for swinging movements toward or from each other widthwise of the last, a pair of arms mounted for swinging movements toward or from each other about axes extending heightwise of the last and pivotally connected respectively to said members in locations opposite to the sides of the toe, the arms being arranged to be swung toward each other by pressure of the end of the toe on said members or away from each other by pressure of the sides of the toe on said members to permit the members to adjust themselves to the toe, and spring means controlling said arms and yieldable in response to swinging movements of the arms either toward or from each other.

35. In a lasting machine, a toe former for wiping the toe end of an upper on a last heightwise of the last, said toe former comprising a pair of members curved to embrace the upper around the toe end of the last and mounted for swinging movements toward or from each other widthwise of the last, a pair of arms mounted for swinging movements toward or from each other about axes extending heightwise of the last and pivotally connected respectively to said members in locations opposite to the sides of the toe, the arms being arranged to be swung toward each other by pressure of the end of the toe on said members or away from each other by pressure of the sides of the toe on said members to permit the members to adjust themselves to the toe, a spring yieldable in response to swinging movements of the arms toward each other, another spring yieldable in response to swinging movements of the arms away from each other, and means arranged to act through said springs to adjust the members toward or from each other.

36. In a lasting machine, the combination with upper-trimming means for removing from the margin of the toe end of a multi-ply upper on a last all but the outer layer of the upper materials at a predetermined time in a cycle of operations of the machine, of means for applying a pull to the toe end of the upper, means for wiping the toe end of the upper heightwise of the last, and controlling means shiftable to different positions to cause said upper-pulling means and wiping means thus to act on the upper either twice in the cycle before and after the upper-trimming operation or only once in the cycle prior to that operation.

37. In a lasting machine, the combination with upper-trimming means for removing from the margin of the toe end of a multi-ply upper on a last all but the outer layer of the upper materials at a predetermined time in a cycle of operations of the machine, of means for applying a pull to the toe end of the upper, means for wiping the toe end of the upper heightwise of the last, controlling members for causing said upper-pulling means and wiping means thus to act on the upper twice in the cycle of operations before and after the upper-trimming operation, other controlling members for causing the upper-pulling means and wiping means to act only once in the cycle prior to the upper-trimming operation, and means for rendering either said first-named controlling members or said other controlling members alternatively effective in the cycle.

38. In a lasting machine, the combination with upper-trimming means for removing from the margin of the toe end of a multi-ply upper on a last all but the outer layer of the upper materials at a predetermined time in a cycle of operations of the machine, of fluid-operated means for applying a pull to the toe end of the upper, fluid-operated means for wiping the toe end of the upper heightwise of the last, controlling members for causing said upper-pulling means and wiping means thus to act on the upper twice in the cycle of operations before and after the upper-trimming operation by control of the operating fluid, other controlling members for causing the upper-pulling means and wiping means to act only once in the cycle prior to the upper-trimming operation by control of the operating fluid, and means for rendering either said first-named controlling members or said other controlling members alternatively effective in the cycle.

39. In a lasting machine, the combination with upper-trimming means for removing from the margin of the toe end of a multi-ply upper on a last all but the outer layer of the upper materials at a predetermined time in a cycle of operations of the machine, of fluid-operated means for applying a pull to the toe end of the upper, fluid-operated means for wiping the toe end of the upper heightwise of the last, power-driven cams for causing said upper-pulling means and wiping means thus to act on the upper twice in the cycle of operations before and after the upper-trimming operation by control of the operating fluid, other power-driven cams for causing the upper-pulling means and wiping means to act only once in the cycle prior to the upper-trimming operation by control of the operating fluid, and means for shifting all said cams as a unit to render either said first-named cams or said other cams alternatively effective in the cycle.

BERNHARDT JORGENSEN.

References Cited in the file of this patent

UNITED STATES PATENTS

| Number | Name | Date |
|---|---|---|
| 1,246,634 | Martino | Nov. 13, 1917 |
| 1,274,589 | Pym | Aug. 6, 1918 |
| 1,695,561 | Pym | Dec. 18, 1928 |
| 1,712,786 | Bosserdet | May 14, 1929 |
| 1,942,414 | Dumser et al. | Jan. 9, 1934 |
| 2,008,013 | Foster | July 16, 1935 |
| 2,167,056 | Roberts | July 25, 1939 |
| 2,219,341 | Stacey | Oct. 29, 1940 |
| 2,324,509 | Jorgensen | July 20, 1943 |
| 2,367,115 | Goepfrich | Jan. 9, 1945 |
| 2,403,003 | Jorgensen | July 2, 1946 |